United States Patent
Byun

(10) Patent No.: US 11,354,051 B2
(45) Date of Patent: Jun. 7, 2022

(54) MEMORY SYSTEM FOR EFFICIENTLY MANAGING MEMORY BLOCK AND OPERATING METHOD THEREOF

(71) Applicant: SK hynix Inc., Icheon (KR)

(72) Inventor: Eujoon Byun, Yongin (KR)

(73) Assignee: SK hynix Inc., Icheon (KR)

( * ) Notice: Subject to any disclaimer, the term of this patent is extended or adjusted under 35 U.S.C. 154(b) by 218 days.

(21) Appl. No.: 16/882,129

(22) Filed: May 22, 2020

(65) Prior Publication Data

US 2021/0117089 A1 Apr. 22, 2021

(30) Foreign Application Priority Data

Oct. 16, 2019 (KR) ........................ 10-2019-0128466

(51) Int. Cl.
*G06F 3/06* (2006.01)

(52) U.S. Cl.
CPC ............ *G06F 3/064* (2013.01); *G06F 3/0604* (2013.01); *G06F 3/0679* (2013.01)

(58) Field of Classification Search
CPC ...... G06F 3/064; G06F 3/0604; G06F 3/0679; G06F 2212/1016; G06F 2212/1032; G06F 2212/7201; G06F 2212/7205; G06F 2212/7208; G06F 3/0616; G06F 3/061; G06F 3/0626; G06F 3/0658; G06F 12/0607

See application file for complete search history.

(56) References Cited

U.S. PATENT DOCUMENTS

| | | | | |
|---|---|---|---|---|
| 9,798,475 B2* | 10/2017 | Kamimura | ............ | G06F 3/0616 |
| 11,237,973 B2* | 2/2022 | Kang | ............ | G06F 11/3037 |
| 2019/0324689 A1* | 10/2019 | Choi | ............ | G06F 3/0653 |
| 2020/0081620 A1* | 3/2020 | Lin | ............ | G06F 3/0616 |
| 2020/0081621 A1* | 3/2020 | Lin | ............ | G06F 3/064 |
| 2020/0081657 A1* | 3/2020 | Lin | ............ | G06F 3/0679 |
| 2021/0004323 A1* | 1/2021 | Kang | ............ | G06F 3/064 |
| 2021/0096761 A1* | 4/2021 | Byun | ............ | G06F 12/124 |
| 2021/0109675 A1* | 4/2021 | Jung | ............ | G06F 3/0659 |

FOREIGN PATENT DOCUMENTS

KR 20110127729 A 11/2011

* cited by examiner

*Primary Examiner* — Francisco A Grullon

(57) ABSTRACT

A memory system includes a memory device including multiple memory blocks and a controller that groups the multiple memory blocks into a plurality of super blocks according to a specific condition, each of the super blocks including two or more memory blocks, sorts a mixed super block among the super blocks, the mixed super block including a source block and a general block, the source block being a memory block having a read count equal to or greater than a reference value, the general block being a memory block having a read count smaller than the reference value, collects and regroups two or more source blocks, included in two or more mixed super blocks, into one or more source super blocks according to the specific condition, and moves valid data of the one or more source super blocks to one or more general super blocks each including general blocks only.

18 Claims, 10 Drawing Sheets

MEMORY SYSTEM FOR EFFICIENTLY MANAGING MEMORY BLOCK AND OPERATING METHOD THEREOF

CROSS-REFERENCE TO RELATED APPLICATION(S)

The present application claims priority under 35 U.S.C. § 119(a) to Korean Patent Application No. 10-2019-0128466, filed on Oct. 16, 2019, the disclosure of which is incorporated herein by reference in its entirety.

BACKGROUND

1. Field

Various embodiments of the present disclosure generally relate to a memory system, and particularly, to a memory system capable of efficiently managing memory blocks included therein, and an operating method thereof.

2. Description of the Related Art

Recently, a computer environment paradigm has shifted to ubiquitous computing, which enables a computer system to be accessed anytime and everywhere. As a result, the use of portable electronic devices such as mobile phones, digital cameras, notebook computers, and the like has rapidly increased. Such portable electronic devices each use or include a memory system that uses or embeds at least one memory device, e.g., a data storage device. A data storage device can be used as a main storage device or an auxiliary storage device of a portable electronic device.

In a computing device, unlike a hard disk, a data storage device includes a nonvolatile semiconductor memory device, which is advantageous in that it has excellent stability and durability because it has no mechanical driving part (e.g., a mechanical arm), and has high data access speed and low power consumption. Examples of such a data storage device include a universal serial bus (USB) memory device, a memory card having various interfaces, a solid state drive (SSD), and the like.

SUMMARY

Various embodiments of the present disclosure are directed to a memory system, a data processing system, and a method for operating the memory system and the data processing system, which may minimize complexity and performance degradation of the memory system, maximize use efficiency of a memory device, and rapidly and stably process data with the memory device.

Various embodiments of the present disclosure are directed to a memory system and an operating method thereof, in which, in a case where memory blocks on which read requests are processed are distributed in two or more super blocks when a plurality of memory blocks are grouped into a plurality of super blocks according to a specific condition, the memory system sorts only the memory blocks on which the read requests are processed from the plurality of super blocks, regroups the memory blocks into a small number of super blocks, and then performs a merge operation on only the small number of super blocks.

In accordance with an embodiment of the present invention, a memory system may include: a nonvolatile memory device including a plurality of memory blocks; and a controller suitable for grouping the plurality of memory blocks into a plurality of super blocks according to a specific condition, each of the plurality of super blocks including two or more memory blocks, sorting a mixed super block among the plurality of super blocks, the mixed super block including a source block and a general block, the source block being a memory block that has a read count equal to or greater than a reference value, the general block being a memory block that has a read count smaller than the reference value, collecting and regrouping two or more source blocks, included in two or more mixed super blocks, into one or more source super blocks according to the specific condition, and moving valid data of the one or more source super blocks to one or more general super blocks each of which includes general blocks only.

The controller may collect and may regroup two or more general blocks included in the two or more mixed super blocks into one or more general super blocks according to the specific condition.

The controller may check a plurality of sum values each of which is obtained by summing up read counts of the memory blocks included in each of the plurality of super blocks, may select a super block corresponding to a sum value equal to or greater than a specific value among the plurality of super blocks, and may sort the selected super block into the mixed super block or the source super block according to types of the memory blocks included in the selected super block.

The controller may sort the selected super block into the source super block when only the source block is included in the selected super block, and may sort the selected super block into the mixed super block when the source block and the general block are included in the selected super block.

The controller may check each of the memory blocks according to a read count, and may sort the mixed super block among the plurality of super blocks according to a check result.

The controller may sort a super block including only source blocks, among the plurality of super blocks, into the source super block according to the check result, and may sort a super block in which the source block and the general block are mixed, among the plurality of super blocks, into the mixed super block according to the check result.

When it is checked that only one mixed super block is present in the nonvolatile memory device for a predetermined time, the controller may move valid data of the one mixed super block to one or more general super blocks.

When the two or more source blocks included in the two or more mixed super blocks are collected for a predetermined time but do not satisfy the specific condition, the controller may move valid data stored in each of the two or more mixed super blocks to one or more general super blocks.

The controller may be connected to the nonvolatile memory device through a plurality of data paths, and the specific condition may include whether two or more memory blocks in the nonvolatile memory device are capable of inputting and outputting data in an interleaving manner through the plurality of data paths.

In accordance with an embodiment of the present invention, a method of operating a memory system that includes a nonvolatile memory device including a plurality of memory blocks, the method may include: grouping the plurality of memory blocks into a plurality of super blocks according to a specific condition, each of the plurality of super blocks including two or more memory blocks; sorting a mixed super block among the plurality of super blocks, the mixed super block including a source block and a general block, the source block being a memory block that has a read count equal to or greater than a reference value, the general block being a memory block that has a read count smaller than the reference value; collecting and regrouping two or more source blocks, included in two or more mixed super blocks, into one or more source super blocks according to the specific condition; and moving valid data of the one or more source super blocks to one or more general super blocks each of which includes general blocks only.

The operating method may further include collecting and regrouping two or more general blocks, included in the two or more mixed super blocks, into one or more general super blocks according to the specific condition.

Sorting the mixed super block may include: checking a plurality of sum values each of which is obtained by summing up read counts of the memory blocks included in each of the plurality of super blocks; selecting a super block corresponding to a sum value equal to or greater than a specific value among the plurality of super blocks; and sorting the selected super block into the mixed super block or the source super block according to types of the memory blocks included in the selected super block.

Sorting the selected super block may include: sorting the selected super block into the source super block when only the source block is included in the selected super block; and sorting the selected super block into the mixed super block when the source block and the general block are included in the selected super block.

Sorting the mixed super block may include: checking each of the memory blocks according to a read count; and sorting the mixed super block among the plurality of super blocks according to a checking result.

Sorting the mixed super block may include: sorting a super block including only the source block, among the plurality of super blocks, into the source super block according to the checking result; and sorting a super block in which the source block and the general block are mixed, among the plurality of super blocks, into the mixed super block according to the checking result.

The operating method may further include, when it is checked that only one mixed super block is present in the nonvolatile memory device for a predetermined time without being regrouped into the source super block, moving valid data of the one mixed super block to one or more general super blocks.

The operating method may further include, when the two or more source blocks included in the two or more mixed super blocks are collected for a predetermined time but do not satisfy the specific condition, moving valid data stored in each of the two or more mixed super blocks to one or more general super blocks.

A plurality of data paths may be connected to the nonvolatile memory device, and the specific condition may include whether two or more memory blocks in the nonvolatile memory device are capable of inputting and outputting data in an interleaving manner through the plurality of data paths.

These and other features and advantages of the present disclosure are not limited to the embodiments described above, and will be apparently understood by those skilled in the art to which the present disclosure pertains from the following detailed description in conjunction with the accompanying drawings.

DETAILED DESCRIPTION

Figure 1:
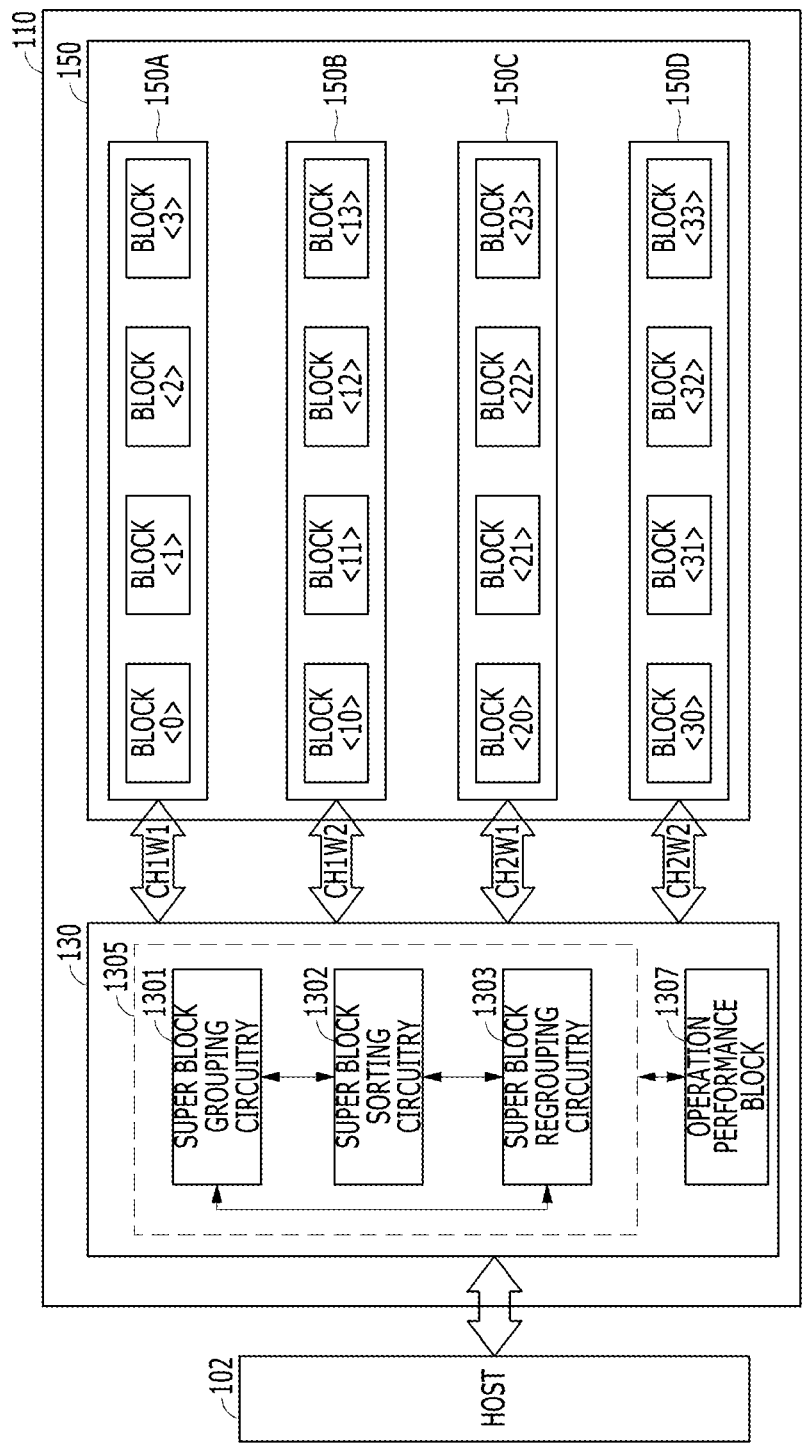
FIG. 1 is a block diagram illustrating a data processing system including a memory system in accordance with an embodiment.

Various examples of the disclosure are described below in more detail with reference to the accompanying drawings. Aspects and features of the present invention, however, may be embodied in different ways to form other embodiments, including variations of any of the disclosed embodiments. Thus, the invention is not to be construed as being limited to the embodiments set forth herein. Rather, the described embodiments are provided so that this disclosure is thorough and complete and fully conveys the disclosure to those skilled in the art to which this invention pertains. Throughout the disclosure, like reference numerals refer to like parts throughout the various figures and examples of the disclosure. It is noted that reference to "an embodiment," "another embodiment," or the like does not necessarily mean only one embodiment, and different references to any such phrase are not necessarily to the same embodiment(s).

It will be understood that, although the terms "first," "second," "third," and so on may be used herein to identify various elements, these elements are not limited by these terms. These terms are used to distinguish one element from another element that otherwise have the same or similar names. Thus, a first element in one instance could be termed a second or third element in another instance without departing from the spirit and scope of the invention.

The drawings are not necessarily to scale and, in some instances, proportions may have been exaggerated in order to clearly illustrate features of the embodiments. When an element is referred to as being connected or coupled to another element, it should be understood that the former can be directly connected or coupled to the latter, or electrically connected or coupled to the latter via one or more intervening elements therebetween. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the invention. As used herein, singular forms are intended to include the plural forms and vice versa, unless the context clearly indicates otherwise. Similarly, the indefinite articles "a" and "an" mean one or more, unless it is clear from the language or context that only one is intended.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the invention belongs in view of the disclosure. It will be further understood that terms, such as those defined in commonly used dictionaries, should be interpreted as having a meaning that is consistent with their meaning in the context of the disclosure and the relevant art, and not be interpreted in an idealized or overly formal sense unless expressly so defined herein.

In the following description, numerous specific details are set forth in order to provide a thorough understanding of the invention. The invention may be practiced without some or all of these specific details. In other instances, well-known process structures and/or processes have not been described in detail in order not to unnecessarily obscure the invention.

It is also noted, that in some instances, as would be apparent to those skilled in the relevant art, a feature or element described in connection with one embodiment may be used singly or in combination with other features or elements of another embodiment, unless otherwise specifically indicated.

Embodiments of the disclosure are described in detail below with reference to the accompanying drawings, wherein like numbers reference like elements.

FIG. 1 is a block diagram illustrating a data processing system including a memory system 110 in accordance with an embodiment.

For example, the memory system 110 may be mounted on a computing device or a mobile device, and then transmit and receive data in interconnection with a host 102.

Referring to FIG. 1, the memory system 110 may include a controller 130 and a memory device 150. The controller 130 may output data, requested by the host 102 and received from the memory device 150, to the host 102 or store data, transferred from the host 102, in the memory device 150. In addition, the controller 130 may internally generate data required for managing an operation of storing or outputting data of the host 102, and store or output the generated data in or to the memory device 150. The memory device 150 may include a plurality of memory dies, e.g., 150A, 150B, 150C, and 150D. The memory dies 150A, 150B, 150C, and 150D may include a plurality of memory blocks BLOCK<0:3>, BLOCK<10:13>, BLOCK<20:23>, and BLOCK<30:33>, respectively. Each of the memory blocks BLOCK<0:3>, BLOCK<10:13>, BLOCK<20:23>, and BLOCK<30:33> may include a plurality of pages each including a plurality of memory cells. The design of the internal configuration of the memory device 150 may be changed depending on characteristics of the memory device 150, a purpose for which the memory system 110 is used, or specifications of the memory system 110 requested by the host 102.

The controller 130 and the memory device 150 may be connected to each other through a plurality of data paths. The memory dies 150A, 150B, 150C, and 150D included in the memory device 150 may be connected to the controller 130 through different data paths, respectively. Referring to FIG. 1, the first memory die 150A may be connected to the controller 130 through a first channel and a first way CH1W1, and the second memory die 150B may be connected to the controller 130 through the first channel and a second way CH1W2. The third memory die 150C may be connected to the controller 130 through a second channel and the first way CH2W1, and the fourth memory die 150D may be connected to the controller 130 through the second channel and the second way CH2W2. The numbers of channels and ways constituting the data paths between the controller 130 and the memory device 150 may vary depending on the number of memory dies included in the memory device 150. The numbers of channels and ways that connect the memory dies 150A, 150B, 150C, and 150D to the controller 130 may be designed depending on a purpose for which the memory system 110 is used or specifications of the memory system 110 requested by the host 102.

The controller 130 may include a super block management block 1305 and an operation performance block 1307. The super block management block 1305 may include super block grouping circuitry 1301, super block sorting circuitry 1302, and super block regrouping circuitry 1303.

As used in this disclosure, the term 'circuitry' may refer to one or more of (a) hardware-only circuit implementations, such as implementations in only analog and/or digital circuitry (b) combinations of circuits and software (and/or firmware), such as: (i) a combination of processor(s) or (ii) portions of processor(s) including digital signal processor (s), software, and a memory that work together to cause an apparatus, such as a mobile phone or server, to perform various functions, and (c) circuits, such as a microprocessor or a portion of a microprocessor that uses software or firmware, even if the software or firmware is not physically present. As a further example, the term "circuitry" may refer to one or more processors or a portion of a processor and accompanying software and/or firmware. The term "circuitry" may refer to an integrated circuit for a storage device.

Specifically, the controller 130 may group the memory blocks BLOCK<0:3>, BLOCK<10:13>, BLOCK<20:23>, and BLOCK<30:33> included in the memory device 150 into a plurality of super blocks according to a "specific condition." The controller 130 may categorize, as a mixed super block, a super block, in which a source block having a read count equal to or greater than a reference value and a general block having a read count smaller than the reference value are mixed and grouped, among the plurality of super blocks. In addition, the controller 130 may categorize, as a source super block, a super block, in which only source blocks having read counts equal to or greater than the reference value are grouped, among the plurality of super blocks.

Each of the plurality of super blocks before being sorted into the mixed super block or the source super block may be assumed to include only general blocks having read counts smaller than the reference value. Accordingly, the controller 130 may check a kind of a memory block included in each of the plurality of super blocks, that is, check whether the memory block is the source block having the read count equal to or greater than the reference value or the general block having the read count smaller than the reference value, and sort the plurality of super blocks into the mixed super block and the source super block. The "reference value" for sorting the memory blocks into the source block and the general block may be set diversely depending on a kind or an operating method of the memory device 150 by a system designer.

The controller 130 may regroup two or more source blocks included in two or more mixed super blocks into the source super block according to the "specific condition." In this case, since one or more source blocks and one or more general blocks may be mixed and included in each of the mixed super blocks, two or more source blocks and two or more general blocks may be included in the two or more mixed super blocks. Since the source super block is determined by regrouping the two or more sources blocks included in the two or more mixed super blocks, the source super block may include source blocks only. Accordingly, the controller 130 may sort the two or more source blocks included the two or more mixed super blocks, and then regroup the sorted two or more source blocks into one or more source super blocks according to the "specific condition." In addition, the controller 130 may sort two or more general blocks included in the two or more mixed super blocks, and then regroup the sorted two or more general blocks into one or more general super blocks according to the "specific condition". The general super block may include general blocks only.

In summary, the controller 130 may collect and regroup two or more source blocks included in two or more mixed super blocks into one or more source super blocks according to the "specific condition." In addition, the controller 130 may collect and regroup two or more general blocks included in the two or more mixed super blocks into one or more general super blocks according to the "specific condition." In other words, the controller 130 may sort the memory blocks included in the two or more mixed super blocks, and then regroup the sorted memory blocks into one or more source super blocks and one or more general super blocks according to a type of each of the memory blocks, i.e., according to whether each of the memory block is a general block or a source block.

The "specific condition" may include whether two or more memory blocks among the plurality of memory blocks BLOCK<0:3>, BLOCK<10:13>, BLOCK<20:23>, and BLOCK<30:33> included in the memory device 150 can input/output data in an interleaving manner through the plurality of data paths CH1W1, CH1W2, CH2W1, and CH2W2 when the data paths CH1W1, CH1W2, CH2W1, and CH2W2 are connected between the controller 130 and the memory device 150 as illustrated in FIG. 1. For example, when two memory blocks selected among the memory blocks BLOCK<0:3>, BLOCK<10:13>, BLOCK<20:23>, and BLOCK<30:33> included in the memory device 150 have a relationship capable of inputting/outputting data in the interleaving manner through the data paths CH1W1, CH1W2, CH2W1, and CH2W2, the selected two memory blocks may be regarded as satisfying the "specific condition." On the contrary, when the selected two memory blocks do not have the relationship capable of inputting/outputting data in the interleaving manner through the data paths CH1W1, CH1W2, CH2W1, and CH2W2, the selected two memory blocks may not be regarded as satisfying the "specific condition." Detailed descriptions for the "specific condition" will be provided later.

The controller 130 may perform a merge operation of moving valid data stored in the source super block to one or more general super blocks. The source super block may include only source blocks having read counts equal to or greater than the reference value. Therefore, in order to maintain reliability of data stored in the source blocks, the merge operation of moving the valid data stored in the source blocks to one or more target blocks in a free or open state needs to be performed. In the merge operation, the valid data stored in the source blocks are copied into the target blocks, and then the data stored in the source blocks are erased. Accordingly, the controller 130 may perform the merge operation of moving all the valid data stored in the source super block to the target blocks included in one or more general super blocks that are in the free or open state, in order to maintain the reliability of data stored in the memory device 150.

The merge operation may be any one of a garbage collection operation, a read reclaim operation, and a wear leveling operation. In the present embodiment, since the source blocks and the general blocks are sorted based on the read counts, the merge operation may refer to as the read reclaim operation. When the source blocks and the general blocks are sorted based on the number of valid pages, the merge operation may refer to as the garbage collection operation. When the source blocks and the general blocks are sorted based on a program/erase cycle, the merge operation may refer to as the wear leveling operation.

The super block management block 1305 included in the controller 130 may perform an operation of collecting and grouping the memory blocks BLOCK<0:3>, BLOCK<10:13>, BLOCK<20:23>, and BLOCK<30:33>, included in the memory device 150, into a plurality of super blocks according to the "specific condition," an operation of sorting the plurality of super blocks into one or more mixed super blocks and one or more source super blocks according to respective states of the super blocks, and an operation of regrouping two or more mixed super blocks into one or more source super blocks and one or more general super blocks.

Specifically, the super block grouping circuitry 1301 included in the super block management block 1305 may perform the operation of collecting and grouping the memory blocks BLOCK<0:3>, BLOCK<10:13>, BLOCK<20:23>, and BLOCK<30:33>, included in the memory device 150, into the plurality of super blocks according to the "specific condition." The super block sorting circuitry 1302 included in the super block management block 1305 may perform an operation of categorizing, as the mixed super block, the super block in which the source block having the read count equal to or greater than the reference value and the general block having the read count smaller than the reference value are mixed and grouped, among the plurality of super blocks. In addition, the super block sorting circuitry 1302 may perform an operation of categorizing, as the source super block, the super block in which only source blocks having the read counts equal to or greater than the reference value are grouped, among the plurality of super blocks. The super block regrouping circuitry 1303 included in the super block management block 1305 may perform the operation of regrouping two or more source blocks included in two or more mixed super blocks into the source super block according to the "specific condition." In addition, the super block regrouping circuitry 1303 may perform an operation of sorting two or more general blocks included in the two or more mixed super blocks and regrouping the sorted two or more general blocks into one or more general super blocks according to the "specific condition."

The operation performance block 1307 included in the controller 130 may perform a data input/output operation on each of the plurality of super blocks, the mixed super block, and the source super block. In addition, the operation performance block 1307 may perform the merge operation on the source super block.

Figure 2:
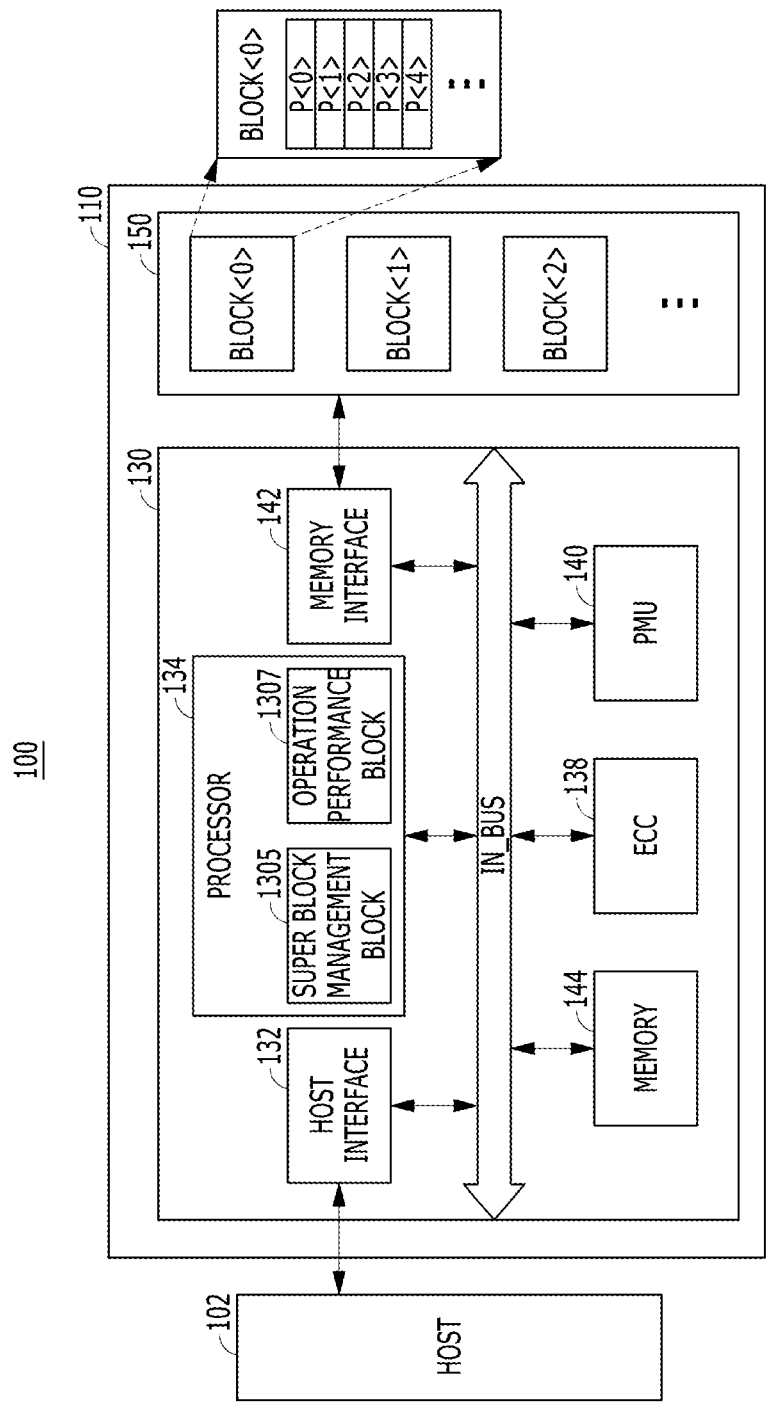
FIG. 2 is a block diagram illustrating a data processing system including a memory system in accordance with an embodiment.

FIG. 2 is a block diagram illustrating a data processing system 100 including a memory system 110 in accordance with an embodiment.

Referring to FIG. 2, the data processing system 100 may include a host 102 engaged or operably coupled with the memory system 110.

The host 102 may include any of a portable electronic device, such as a mobile phone, an MP3 player, a laptop computer, or the like, and an electronic device, such as a desktop computer, a game player, a television (TV), a projector, or the like.

The host 102 includes at least one operating system (OS) that can generally manage and control functions and operations performed by the host 102. The OS may provide interoperability between the host 102 engaged with the memory system 110 and a user of the memory system 110. The OS may support functions and operations corresponding to user's requests. By way of example but not limitation, the OS may include a general operating system, a mobile operating system, or both according to mobility of the host 102. The general operating system may include a personal operating system and an enterprise operating system according to system requirements or user's working environment. The personal operating system may be subject to support services for general purposes and include any of Windows and Chrome. The enterprise operating system may be specialized for securing and supporting high performance and include any of Windows servers, Linux, and Unix. Further, the mobile operating system may include any of an Android and iOS. The mobile operating system may be subject to support services or functions for mobility (e.g., a power saving function).

The host 102 may include a plurality of operating systems. The host 102 may execute multiple operating systems in cooperation with the memory system 110 to correspond to a user's request. The host 102 may transmit a plurality of commands corresponding to the user's requests to the memory system 110, thereby performing operations corresponding to the plurality of commands in the memory system 110.

The memory system 110 may perform a specific function or operation in response to a request from the host 102 and, particularly, may store data to be accessed by the host 102. The memory system 110 may be used as a main memory system or an auxiliary memory system of the host 102. The memory system 110 may be implemented with any one of various types of storage devices, which may be electrically coupled with the host 102, according to a protocol of a host interface. Non-limiting examples of suitable storage devices include a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, and a memory stick.

The storage device for the memory system 110 may be implemented with a volatile memory device, such as a dynamic random access memory (DRAM) or a static RAM (SRAM), and/or a nonvolatile memory device, such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM or ReRAM), or a flash memory.

The memory system 110 may include a controller 130 and a memory device 150. The memory device 150 may store data to be accessed by the host 102. The controller 130 may control an operation of storing data in the memory device 150.

The controller 130 and the memory device 150 may be integrated into a single semiconductor device, which may be included in any of the various types of storage devices as described above.

By way of example but not limitation, the controller 130 and the memory device 150 may be integrated into one semiconductor device to form an SSD with an improved operating speed. When the memory system 110 is used as the SSD, the operating speed of the host 102 connected to the memory system 110 can be improved more than that of a host connected with a hard disk. In another embodiment, the controller 130 and the memory device 150 may be integrated into one semiconductor device to form a memory card, such as a PC card (PCMCIA), a compact flash card (CF), a smart media card (e.g., SM or SMC), a memory stick, a multimedia card (e.g., MMC, RS-MMC, or MMCmicro), a secure digital (SD) card (e.g., SD, miniSD, microSD, or SDHC), or a universal flash memory card.

The memory system 110 may be configured as a part of, for example, a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation system, a black box, a digital camera, a digital multimedia broadcasting (DMB) player, a 3-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various components configuring a computing system.

The memory device 150 may be a nonvolatile memory device and may retain data stored therein even while electrical power is not supplied. The memory device 150 may store data provided by the host 102 through a write operation and provide data stored therein to the host 102 through a read operation. The memory device 150 may include a plurality of memory blocks BLOCK<0, 1, 2, . . . >, each of which may include a plurality of pages P<0, 1, 2, 3, 4, . . . >. Each of the plurality of pages P<0, 1, 2, 3, 4, . . . > may include a plurality of memory cells to which a corresponding one of a plurality of word lines (WL) is coupled. The memory device 150 also includes a plurality of memory dies 150A, 150B, 150C, and 150D as shown in FIG. 1, each of which includes a plurality of planes. Each of the planes includes some memory blocks among the plurality of memory blocks BLOCK<0, 1, 2, . . . >. In addition, the memory device 150 may be a flash memory, and the flash memory may have a three-dimensional stack structure.

The controller 130 may control overall operations of the memory device 150, such as read, write (or program), and erase operations. For example, the controller 130 may control the memory device 150 in response to a request from the host 102. The controller 130 may provide data, read from the memory device 150, to the host 102. The controller 130 may store data provided by the host 102 in the memory device 150.

The controller 130 may include a host interface 132, a processor 134, error correction code (ECC) circuitry 138, a power management unit (PMU) 140, a memory interface 142, and a memory 144, all operatively coupled via an internal bus IN_BUS.

The host interface 132 may process commands and data provided by the host 102, and may communicate with the host 102 using at least one of various interface protocols such as universal serial bus (USB), multimedia card (MMC), peripheral component interconnect-express (PCI-e or PCIe), small computer system interface (SCSI), serial-attached SCSI (SAS), serial advanced technology attachment (SATA), parallel advanced technology attachment (PATA), small computer system interface (SCSI), enhanced small disk interface (ESDI), and integrated drive electronics (IDE).

The ECC circuitry 138 may detect and correct error bits of data outputted from the memory device 150 and may include an ECC encoder and an ECC decoder. Here, the ECC encoder may perform error correction encoding on data to be programmed in the memory device 150 and generate encoded data into which a parity bit is added, and may store the encoded data in the memory device 150. The ECC decoder may detect and correct error bits contained in data read from the memory device 150 when the controller 130 reads the data stored in the memory device 150. In other words, after performing error correction decoding on the data read from the memory device 150, the ECC circuitry 138 may determine whether the error correction decoding has succeeded and output an instruction signal (e.g., a correction success signal or a correction fail signal). The ECC circuitry 138 may use the parity bit, which is generated during the ECC encoding process, to correct the error bits of the read data. When the number of error bits is greater than the number of correctable error bits, the ECC circuitry 138 may not correct the error bits, and instead may output an error correction fail signal indicating failure in correcting the error bits.

The ECC circuitry 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), or a Block coded modulation (BCM). The ECC circuitry 138 may include any or all circuits, modules, systems, or devices for performing the error correction operation based on at least one of the above described codes.

The PMU 140 may manage electrical power in the controller 130. For example, the PMU 140 may detect power-on and power-off. In addition, the PMU 140 may include a power detector.

The memory interface 142 may serve as an interface for handling commands and data transferred between the controller 130 and the memory device 150 in order to allow the controller 130 to control the memory device 150 in response to a request delivered from the host 102. The memory interface 142 may generate a control signal for the memory device 150 and may process write data to be written in the memory device 150 or read data outputted from the memory device 150 under the control of the processor 134 when the memory device 150 is a flash memory, in particular, when the memory device 150 is a NAND flash memory. The memory interface 142 may provide operations of a NAND flash interface between the controller 130 and the memory device 150. In accordance with an embodiment, the memory interface 142 may be implemented with firmware called a flash interface layer (FIL) as a component for exchanging data with the memory device 150.

The memory 144 may support operations performed by the memory system 110 and the controller 130. The memory 144 may store temporary data or transactional data generated or delivered for operations in the memory system 110 and the controller 130. The controller 130 may control the memory device 150 in response to a request from the host 102. The controller 130 may deliver data read from the memory device 150 to the host 102. The controller 130 may store data entered from the host 102 within the memory device 150. The memory 144 may be used to store data used by the controller 130 and the memory device 150 to perform operations such as read operations or program/write operations.

The memory 144 may be a volatile memory. The memory 144 may be implemented with a static random access memory (SRAM), a dynamic random access memory (DRAM), or both. Although FIG. 2 shows the memory 144 disposed within the controller 130, embodiments are not limited to that arrangement. That is, the memory 144 may be disposed within or external to the controller 130. For instance, the memory 144 may be an external volatile memory having a memory interface transferring data and/or signals between the memory 144 and the controller 130.

The memory 144 may store data for performing operations such as data writing and data reading requested by the host 102 and/or data transfer between the memory device 150 and the controller 130 for background operations such as garbage collection and wear levelling. In accordance with an embodiment, for supporting operations in the memory system 110, the memory 144 may be used as one or more of a program memory, a data memory, a write buffer/cache, a read buffer/cache, a data buffer/cache, and a map buffer/cache.

The processor 134 may be a microprocessor or a central processing unit (CPU). The memory system 110 may include one or more processors 134. The processor 134 may control the overall operations of the memory system 110. By way of example but not limitation, the processor 134 can control a program operation or a read operation of the memory device 150 in response to a write request or a read request entered from the host 102, respectively. In accordance with an embodiment, the processor 134 may use or execute firmware to control the overall operations of the memory system 110. Herein, the firmware may be a flash translation layer (FTL). The FTL may serve as an interface between the host 102 and the memory device 150. The host 102 may transmit requests for write and read operations to the memory device 150 through the FTL.

The FTL may manage operations of address mapping, garbage collection, wear-leveling, and so forth. Particularly, the FTL may load, generate, update, or store map data. Therefore, the controller 130 may map a logical address, which is entered from the host 102, with a physical address of the memory device 150 based on the map data. The memory device 150 may function as a general storage device to perform a read or write operation. Also, through the address mapping operation based on the map data, when the controller 130 tries to update data stored in a particular page of the memory device 150, the controller 130 may program the updated data in another empty page of the memory device 150 and may invalidate old data of the particular page (e.g., update a physical address, corresponding to a logical address of the updated data, from the particular page to the newly programed page) due to a characteristic of a flash memory device used as the memory device 150. Further, the controller 130 may store map data of the updated data into the FTL.

For example, when performing an operation requested by the host 102 on the memory device 150, the controller 130 uses the processor 134. The processor 134 engaged with the memory device 150 may manage instructions or commands corresponding to a command from the host 102. The controller 130 may perform, as a foreground operation, a command operation corresponding to the command from the host 102, such as a program operation corresponding to a write command, a read operation corresponding to a read command, an erase/discard operation corresponding to an erase/discard command, or a parameter set operation corresponding to a set parameter command or a set feature command with a set command.

The controller 130 may perform a background operation on the memory device 150 using the processor 134. By way of example but not limitation, the background operation performed on the memory device 150 may include an operation of swapping and processing the memory blocks BLOCK<0, 1, 2, . . . > of the memory device 150 or data stored in the memory blocks BLOCK<0, 1, 2, . . . >, for example, the wear leveling (WL) operation or the read reclaim (RR) operation. In addition, the background operation performed on the memory device 150 may include an operation of storing map data stored in the controller 130 in the memory blocks BLOCK<0, 1, 2, . . . > of the memory device 150, for example, a map flush operation, or a bad block management operation of checking and processing a bad block in the memory blocks BLOCK<0, 1, 2, . . . > included in the memory device 150.

The operation of copying, swapping, moving, or merging the memory blocks BLOCK<0, 1, 2, . . . > or the data stored in the memory blocks BLOCK<0, 1, 2, . . . >, such as the garbage collection operation, the wear leveling operation, and the read reclaim operation, may be defined as the merge operation, and the merge operation may be controlled by the operation performance block 1307 included in the processor 134 of the controller 130.

In the memory system 110, the controller 130 performs a plurality of command operations corresponding to a plurality of commands received from the host 102. For example, when performing a plurality of program operations corresponding to plural program commands, a plurality of read operations corresponding to plural read commands, and a plurality of erase operations corresponding to plural erase commands sequentially, randomly, or alternatively, the controller 130 may determine which channel(s) or way(s) for connecting the controller 130 to which memory die(s) in the memory device 150 is/are proper or appropriate for performing each command operation. The controller 130 may transmit data or instructions through the channel(s) or way(s) for performing each command operation. The plurality of memory dies in the memory device 150 may transmit an operation result to the controller 130 through the same channel(s) or way(s), respectively, after each command operation is complete. Then, the controller 130 may transmit a response or an acknowledge signal to the host 102. In an embodiment, the controller 130 may check a status of each channel or each way. In response to a command received from the host 102, the controller 130 may select at least one channel and at least one way based on the status of each channel or each way so that instructions and/or operation results with data may be delivered from the memory device 150 to the controller 130 through the selected channel(s) and way(s).

The controller 130 may check statuses of a plurality of channels (or ways) coupled to the plurality of memory dies in the memory device 150.

The controller 130 may determine each channel or each way as being in a busy state, a ready state, an active state, an idle state, a normal state, or an abnormal state. The controller's determination of which channel or way an instruction (and/or data) is delivered through can be based on, e.g., a physical block address of a memory die to which the instruction (and/or data) is delivered. The controller 130 may refer to descriptors delivered from the memory device 150. The descriptors may include a block or page of parameters describing characteristics of the memory device 150, and may have a set format or structure. The descriptors may include device descriptors, configuration descriptors, unit descriptors, and the like. The controller 130 can refer to, or use, the descriptors to determine channel(s) or way(s) that are used to exchange an instruction or data between the controller 130 and the memory device 150.

A management unit (not shown) may be included in the processor 134. The management unit may perform bad block management for the memory device 150. The management unit may find bad memory blocks, which are in unsatisfactory condition for further use, as well as performing the bad block management on the bad memory blocks. When the memory device 150 is a flash memory such as a NAND flash memory, a program failure may occur during a program (or write) operation due to characteristics of a NAND logic function. During the bad block management, data stored in the program-failed memory block or the bad memory block may be programmed into a new memory block. For example, a read failure may occur while reading data, and a memory block in which the read failure occurs is managed as the bad memory block. The bad memory blocks may substantially reduce the utilization efficiency of the memory device 150 having a 3D stack structure and the reliability of the memory system 110. Thus, reliable bad block management may enhance or improve performance of the memory system 110.

The processor 134 of the controller 130 may control an operation of collecting and grouping the memory blocks BLOCK<0, 1, 2, . . . > included in the memory device 150 into the super blocks according to the specific condition. To this end, the controller 130 may further include the super block management block 1305.

Meanwhile, program, read, and erase operations of the controller 130 will be described as follows.

The controller 130 may store program data, corresponding to a program (or write) command inputted from the host 102, in a buffer/cache included in the memory 144 of the controller 130, and then store the data, stored in the buffer/cache, in the memory blocks BLOCK<0, 1, 2, . . . > included in the memory device 150. In other words, when the program command is inputted from the host 102, the controller 130 may perform the program operation corresponding to the program command. At this time, the controller 130 may store the program data, corresponding to the program command, in at least one of the memory blocks BLOCK<0, 1, 2, . . . > included in the memory device 150, for example, empty memory blocks where the erase operation has been performed, open memory blocks, or free memory blocks among the memory blocks BLOCK<0, 1, 2, . . . >. Also, the controller 130 may update map data corresponding to the program operation performed on the memory device 150, and then store the updated map data in the memory blocks BLOCK<0, 1, 2, . . . > included in the memory device 150. In other words, the controller 130 may store logical to physical address information (L2P mapping information) and physical to logical address information (P2L mapping information) on user data stored in the memory blocks BLOCK<0, 1, 2, . . . >, in the form of a map table or a map list, in empty memory blocks, open memory blocks, or free memory blocks among the memory blocks BLOCK<0, 1, 2, . . . > included in the memory device 150.

When a read command is inputted from the host 102, the controller 130 may check map data corresponding to a logical address inputted with the read command to find a physical address corresponding to the logical address, and read data corresponding to the read command from the memory device 150 based on the physical address. Subsequently, the controller 130 may store the read data in the buffer/cache included in the memory 144 of the controller 130, and then provide the host 102 with the data stored in the buffer/cache.

When an erase command is inputted from the host 102, the controller 130 may perform the erase operation of checking a memory block corresponding to the erase command, erasing data stored in the checked memory block, updating map data corresponding to the erased data, and then storing the updated map data in the memory blocks BLOCK<0, 1, 2, . . . > included in the memory device 150. Herein, the map data may include logical to physical (L2P) information and physical to logical (P2L) information on data stored in the memory blocks BLOCK<0, 1, 2, . . . >, corresponding to the program operation.

The data corresponding to the commands may include user data and meta data generated by the controller 130. The meta data may include map data generated by the controller 130 and corresponding to the user data stored in the memory device 150. In addition, the meta data may include information on commands inputted from the host 102, information on command operations corresponding to the commands, information on memory blocks of the memory device 150 on which the command operations are performed, and information on map data corresponding to the command operations. In other words, the meta data may include information and data for the command operations except for the user data corresponding to the commands inputted from the host 102. As described above, the meta data may be generated from the inside of the controller 130.

The user data stored in the memory device 150 may be sorted in units of segments each having a predetermined size. The predetermined size may be the same as a minimum data size required for the memory system 110 to interwork with the host 102. In some embodiments, the sizes of data segments, which are units of the user data, may be determined according to a configuration and a control method of the memory device 150. While storing the data segments of the user data in the memory blocks of the memory device 150, the controller 130 may generate or update a map address corresponding to the stored data segments. Meta segments, which are units of the meta data including the map address, may include logical to physical (L2P) segments and physical to logical (P2L) segments, and may be stored in the memory blocks of the memory device 150 when the map segments are generated by the controller 130 or when the map segments are stored in the memory blocks and then updated after being loaded into the memory 144.

Figure 3:
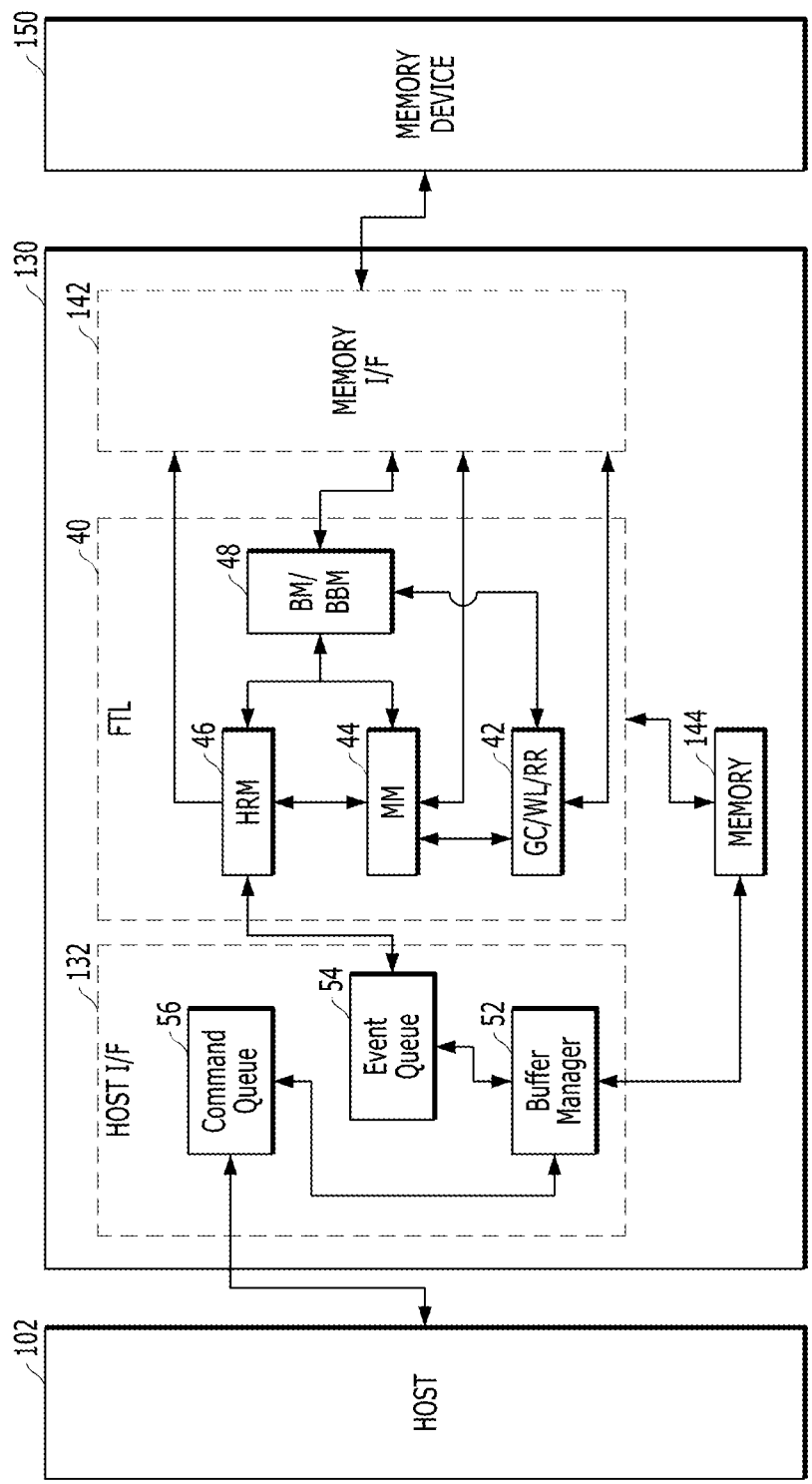
FIG. 3 is a block diagram illustrating a controller in a memory system in accordance with an embodiment.

FIG. 3 is a block diagram illustrating a controller in a memory system in accordance with another embodiment of the present disclosure.

Referring to FIG. 3, the controller 130 cooperates with the host 102 and the memory device 150. The controller 130 may include a host interface (I/F) 132, flash translation layer (FTL) circuitry 40, a memory interface (I/F) 142, and a memory 144.

The host interface 132 may handle commands and data from the host 102. By way of example but not limitation, the host interface 132 may include a command queue 56, a buffer manager 52 and an event queue 54. The command queue 56 may sequentially store commands and data from the host 102 and output them to the buffer manager 52 in a stored order. The buffer manager 52 may classify, manage, or adjust commands and data which are delivered from the command queue 56. The event queue 54 may sequentially transmit events for processing the commands and the data from the buffer manager 52.

A plurality of commands or data having the same characteristics may be continuously received from the host 102, or commands and data having different characteristics may be transmitted to the memory system 110 after being mixed. For example, a plurality of read commands may be delivered, or read commands and program/write commands may be alternately transmitted to the memory system 110. The host interface 132 may sequentially store commands and data, which are received from the host 102, to the command queue 56. Thereafter, the host interface 132 may estimate or predict what kind of internal operation the controller 130 will perform according to the characteristics of the command and data which is received from the host 102. The host interface 132 may determine a processing order and a priority of commands and data, based at least on their characteristics. According to characteristics of commands and data, from the host 102, the buffer manager 52 in the host interface 132 is configured to determine whether the buffer manager 52 should store commands and data in the memory 144, or whether the buffer manager 52 should deliver the commands and the data into the flash translation layer (FTL) circuitry 40. The event queue 54 receives events, entered from the buffer manager 52, which are to be internally executed and processed by the memory system 110 or the controller 130 in response to the commands and the data from the host 102, so as to deliver the events into the flash translation layer (FTL) circuitry 40 in the order received.

In accordance with an embodiment, the host interface 132 in FIG. 3 may perform the functions of the controller 130 in FIG. 2.

In accordance with an embodiment, the flash translation layer (FTL) circuitry 40 may include a state manager (GC/WL/RR) 42, a map manager (MM) 44, a host request manager (HRM) 46, and a block manager (BM/BBM) 48. The host request manager 46 may manage the events entered from the event queue 54. The map manager 44 may handle or control map data. The state manager 42 may perform the merge operation, such as the garbage collection operation (GC), the wear leveling operation (WL) or the read reclaim operation (RR). The block manager 48 may execute commands or instructions onto a block in the memory device 150.

By way of example but not limitation, the host request manager 46 may use the map manager 44 and the block manager 48 to handle or process requests according to the read and program commands, and events which are delivered from the host interface 132. The host request manager 46 may send an inquiry request to the map data manager 44, to determine a physical address corresponding to the logical address which is entered with the events. The host request manager 46 may send a read request with the physical address to the memory interface 142, to process the read request (handle the events). On the other hand, the host request manager 46 may send a program request (or write request) to the block manager 48, to program entered data to an empty page (i.e., a page having no data) in the memory device 150, and then, may transmit a map update request corresponding to the program request to the map manager 44, to update mapping addresses.

The block manager 48 may convert a program request delivered from the host request manager 46, the map data manager 44, and/or the state manager 42 into a flash program request used for the memory device 150, to manage flash blocks in the memory device 150. In order to maximize or enhance program or write performance of the memory system 110 (see FIG. 2), the block manager 48 may collect program requests and send flash program requests for multiple-plane and one-shot program operations to the memory interface 142. The block manager 48 may send several flash program requests to the memory interface 142 to enhance or maximize parallel processing of the multi-channel and multi-directional flash controller.

The block manager 48 may be configured to manage blocks in the memory device 150 according to the number of valid pages, select and erase blocks having no valid pages when a free block is needed, and select a block including the least number of valid pages when it is determined that garbage collection is necessary. The state manager 42 may perform garbage collection to move the valid data to an empty block and erase remaining data in the blocks from which the valid data was moved so that the block manager 48 may have enough free blocks. If the block manager 48 provides information regarding a block to be erased to the state manager 42, the state manager 42 is able to check all flash pages of the block to be erased to determine whether each page is valid. To determine validity of each page, the state manager 42 may identify a logical address stored in an out-of-band (OOB) area of each page. To determine whether each page is valid, the state manager 42 may compare the physical address of the page with the physical address mapped to the logical address obtained from the request. The state manager 42 sends a program request to the block manager 48 for each valid page. A mapping table may be updated through the update of the map manager 44 when the program operation is complete.

The map manager 44 may manage a logical-physical mapping table. The map manager 44 may process requests such as queries and updates, which are generated by the host request manager 46 or the state manager 42. The map manager 44 may store the entire mapping table in the memory device 150 (e.g., a flash/non-volatile memory) and cache mapping entries according to the storage capacity of the memory 144. When a map cache miss occurs while processing inquiry or update requests, the map manager 44 may send a read request to the memory interface 142 to load a relevant mapping table stored in the memory device 150. When the number of dirty cache blocks in the map manager 44 exceeds a certain threshold, a program request may be sent to the block manager 48 so that a clean cache block is made and the dirty map table may be stored in the memory device 150.

When garbage collection is performed, the state manager 42 copies valid page(s) into a free block, and the host request manager 46 may program the latest version of the data for the same logical address of the page and issue an update request. When the state manager 42 requests the map update in a state in which copying of valid page(s) has not been completed, the map manager 44 may not perform the mapping table update. This is because the map request is issued with old physical information if the state manger 42 requests a map update and a valid page copy is not completed until later. The map manager 44 may perform a map update operation to ensure accuracy only if the latest map table still points to an old physical address.

In some embodiments, at least one of the block manager 48, the map manager 44, and the state manager 42 described with reference to FIG. 3 may include the super block management block 1305 and the operation performance block 1307 described with reference to FIGS. 1 and 2.

The memory device 150 may include a plurality of memory blocks. Each of the plurality of memory blocks may be a single level cell (SLC) memory block or a multi-level cell (MLC) memory block, according to the number of bits that can be stored or represented in one memory cell of such block. Here, the SLC memory block includes a plurality of pages implemented by memory cells, each storing one bit of data. The SLC memory block can have high data I/O operation performance and high durability. The MLC memory block includes a plurality of pages implemented by memory cells, each storing multi-bit data (e.g., two bits or more). The MLC memory block can have a larger storage capacity for the same space compared to the SLC memory block. The MLC memory block can be highly integrated in terms of storage capacity. In an embodiment, the memory device 150 may be implemented with MLC memory blocks, such as a double level cell memory block, a triple level cell (TLC) memory block, a quadruple level cell (QLC) memory block and a combination thereof. The double level memory block may include a plurality of pages implemented by memory cells, each capable of storing 2-bit data. The triple level cell (TLC) memory block may include a plurality of pages implemented by memory cells, each capable of storing 3-bit data. The quadruple level cell (QLC) memory block may include a plurality of pages implemented by memory cells, each capable of storing 4-bit data. In another embodiment, the memory device 150 may be implemented with a block including a plurality of pages implemented by memory cells, each capable of storing 5 or more bits of data.

In an embodiment of the present disclosure, the memory device 150 is a nonvolatile memory such as a flash memory that is a NAND flash memory, a NOR flash memory, or the like. In another embodiment, the memory device 150 may be at least one of a phase change random access memory (PCRAM), a ferroelectric random access memory (FRAM), and a spin injection magnetic memory (e.g., a spin transfer torque magnetic random access memory (STT-MRAM)).

Figure 4:
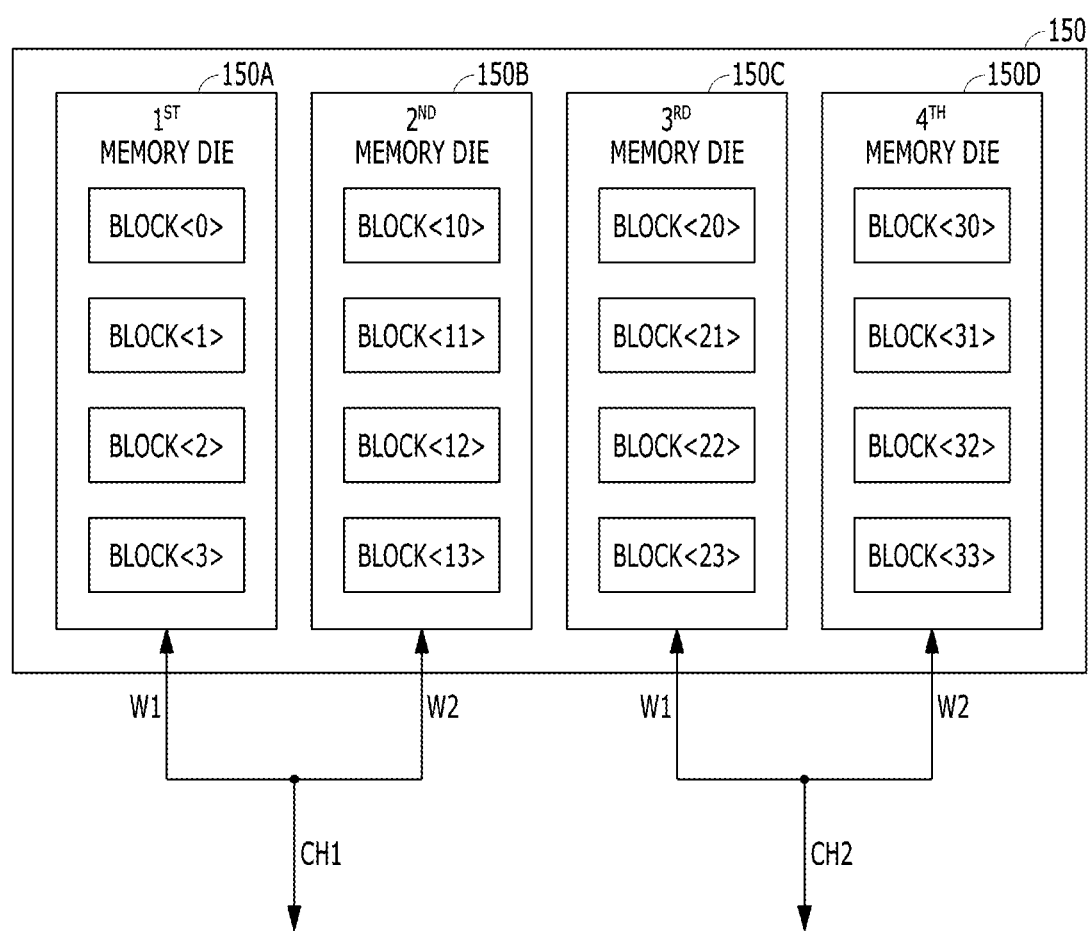
FIG. 4 is a block diagram illustrating an internal configuration of a memory device in accordance with an embodiment.

FIG. 4 is a block diagram illustrating an internal configuration of the memory device 150 shown in FIGS. 1 to 3 in accordance with an embodiment.

Referring to FIG. 4, the memory device 150 may include a plurality of memory dies, e.g., four memory dies 150A, 150B, 150C, and 150D. The first and second memory dies 150A and 150B may be connected to a controller, e.g., the controller 130 shown in FIGS. 1 to 3, through a first channel CH1. The third and fourth memory dies 150C and 150D may be connected to the controller 130 through a second channel CH2.

Although it is described in FIG. 4 that the four memory dies 150A, 150B, 150C, and 150D are connected to the controller 130 through the two channels CH1 and CH2, the memory device 150 may include various numbers of memory dies, such as two or eight memory dies, and various numbers of channels, such as two, three, four, or five, may be provided as well. The number of memory dies in the memory device 150 and the number of channels may be changed depending on a purpose for which a memory system 110 including the controller 130 and the memory device 150 is used, required performance of the memory system 110, and the like.

When a plurality of memory dies are connected to one channel, each of the memory dies may be connected to the channel through a way. Referring to FIG. 4, the first memory die 150A and the second memory die 150B may be connected to the first channel CH1 through a first way W1 and a second way W2, respectively. The third memory die 150C and the fourth memory die 150D may be connected to the second channel CH2 through the first way W1 and the second way W2, respectively. The number of ways may be determined depending on the number of memory dies connected to each channel.

The controller 130 may collect and group, in at least twos, a plurality of memory blocks BLOCK<0:3>, BLOCK<10:13>, BLOCK<20:23>, and BLOCK<30:33>, included in the memory device 150, into a plurality of super blocks according to a "specific condition."

Specifically, the "specific condition" may include whether two or more memory blocks among the plurality of memory blocks BLOCK<0:3>, BLOCK<10:13>, BLOCK<20:23>, and BLOCK<30:33> included in the memory device 150 can input/output data in an interleaving manner through the plurality of data paths CH1W1, CH1W2, CH2W1, and CH2W2 in a state where the data paths CH1W1, CH1W2, CH2W1, and CH2W2 are connected between the controller 130 and the memory device 150 as illustrated in FIG. 4.

Specifically, when two or more memory dies, which input/output data through different data paths, among the memory dies 150A, 150B, 150C, and 150D, input/output data in the interleaving manner, the two or more memory dies may be regarded as satisfying the "specific condition."

For example, since the first memory die 150A is connected to the first way W1 of the first channel CH1 and the second memory die 150B is connected to the second way W2 of the first channel CH1, any one of the memory blocks BLOCK<0:3> included in the first memory die 150A and any one of the memory blocks BLOCK<10:13> included in the second memory die 150B may input/output data in the interleaving manner, and thus be regarded as satisfying the "specific condition."

For another example, since the first memory die 150A is connected to the first way W1 of the first channel CH1, the second memory die 150B is connected to the second way W2 of the first channel CH1, and the third memory die 150C is connected to the first way W1 of the second channel CH2, any one of the memory blocks BLOCK<0:3> included in the first memory die 150A, any one of the memory blocks BLOCK<10:13> included in the second memory die 150B, and any one of the memory blocks BLOCK<20:23> included in the third memory die 150C may input/output data in the interleaving manner, and thus be regarded as satisfying the "specific condition."

For still another example, since the first memory die 150A is connected to the first way W1 of the first channel CH1, the second memory die 150B is connected to the second way W2 of the first channel CH1, the third memory die 150C is connected to the first way W1 of the second channel CH2, and the fourth memory die 150D is connected to the second way W2 of the second channel CH2, any one of the memory blocks BLOCK<0:3> included in the first memory die 150A, any one of the memory blocks BLOCK<10:13> included in the second memory die 150B, any one of the memory blocks BLOCK<20:23> included in the third memory die 150C, and any one of the memory blocks BLOCK<30:33> included in the fourth memory die 150D may input/output data in the interleaving manner, and thus be regarded as satisfying the "specific condition."

For contrary example, since the memory blocks BLOCK<0:3> included in the first memory die 150A are connected to the same data path CH1W1, the memory blocks BLOCK<0:3> may not input/output data in the interleaving manner, and thus may not be regarded as satisfying the "specific condition."

In another contrary example, since the memory blocks BLOCK<10:13> included in the second memory die 150B are connected to the same data path CH1W2, the memory blocks BLOCK<10:13> may not input/output data in the interleaving manner, and thus may not be regarded as satisfying the "specific condition."

In still another contrary example, since, among one of the memory blocks BLOCK<0:3> included in the first memory die 150A and two of the memory blocks BLOCK<10:13> included in the second memory die 150B, two memory blocks in the different memory dies, e.g., one memory block of the first memory die 150A and one memory block of the second memory die 150B, are connected to different data paths CH1W1 and CH1W2, respectively, but the two memory blocks in the same memory die, e.g., the two memory blocks of the second memory die 150B, are connected to the same data path CH1W2, the three memory blocks may not input/output data in the interleaving manner, and thus may not be regarded as satisfying the "specific condition."

Figure 5A:
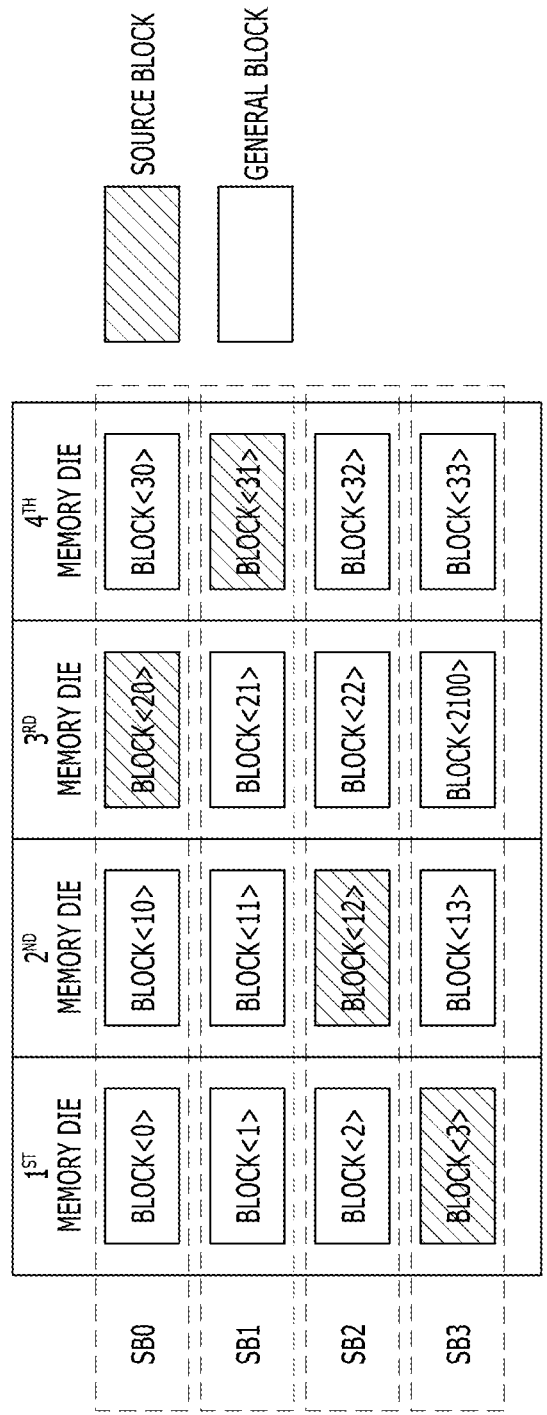
FIGS. 5A and 5B illustrate an operating method of a memory system in accordance with an embodiment.
Figure 5B:
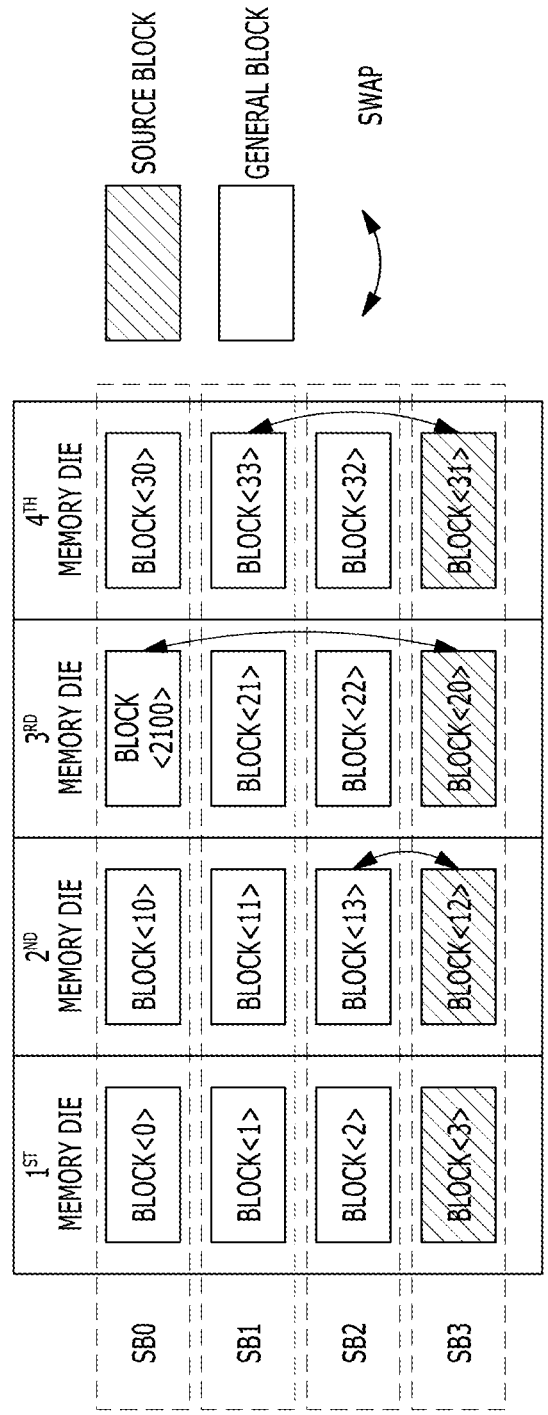

FIGS. 5A and 5B illustrate an operating method of a memory system according to an embodiment.

Referring to FIGS. 5A and 5B, a memory device includes a plurality of memory dies 150A, 150B, 150C, and 150D in the same manner as the memory device 150 described with reference to FIG. 1. However, although FIG. 1 illustrates that the four memory blocks are included in each of the memory dies 150A, 150B, 150C, and 150D, a larger number of memory blocks may be included in each of the memory dies 150A, 150B, 150C, and 150D in FIGS. 5A and 5B. In FIGS. 5A and 5B, it may be seen that one memory block is selected from each of a plurality of memory blocks BLOCK<0, 1, 2, 3, . . . >, BLOCK<10, 11, 12, 13, . . . >, BLOCK<20, 21, 22, 23, . . . >, and BLOCK<30, 31, 32, 33, . . . > included in the memory dies 150A, 150B, 150C, and 150D, respectively, and the selected memory blocks are grouped into a plurality of super blocks, e.g., SB0, SB1, SB2, and SB3.

In other words, it may be seen that four first memory blocks BLOCK<0, 10, 20, 30> included in the respective four memory dies 150A, 150B, 150C, and 150D are collected and grouped into a first super block SB0. It may be seen that four second memory blocks BLOCK<1, 11, 21, 31> included in the respective four memory dies 150A, 150B, 150C, and 150D are collected and grouped into a second super block SB1. It may be seen that four third memory blocks BLOCK<2, 12, 22, 32> included in the respective four memory dies 150A, 150B, 150C, and 150D are collected and grouped into a third super block SB2. It may be seen that three fourth memory blocks BLOCK<3, 13, 33> included in the respective first, second, and fourth memory dies 150A, 150B, and 150D and a $101^{st}$ memory block BLOCK<2100> included in the third memory die 150C are collected and grouped into a fourth super block SB3.

In FIG. 5A, it is assumed that the memory blocks BLOCK<3, 12, 20, 31> in the first to fourth super blocks SB0 to SB3 are source blocks, and the other memory blocks in the first to fourth super blocks SB0 to SB3 are general blocks. Specifically, referring to FIGS. 1 and 5A, it may be seen that the source block BLOCK<20> having a read count equal to or greater than a reference value and the general blocks BLOCK<0, 10, 30> having read counts smaller than the reference value are mixed and included in the first super block SB0. Therefore, the controller 130 may categorize the first super block SB0 as the mixed super block. Similarly, it may be seen that the source block BLOCK<31> having a read count equal to or greater than the reference value and the general blocks BLOCK<1, 11, 21> having read counts smaller than the reference value are mixed and included in the second super block SB1. Therefore, the controller 130 may categorize the second super block SB1 as the mixed super block. It may be seen that the source block BLOCK<12> having a read count equal to or greater than the reference value and the general blocks BLOCK<2, 22, 32> having read counts smaller than the reference value are mixed and included in the third super block SB2. Therefore, the controller 130 may categorize the third super block SB2 as the mixed super block. It may be seen that the source block BLOCK<3> having a read count equal to or greater than the reference value and the general blocks BLOCK<13, 2100, 33> having read counts smaller than the reference value are mixed and included in the fourth super block SB3. Therefore, the controller 130 may categorize the fourth super block SB3 as the mixed super block.

As such, the controller 130 may sort the first to fourth super blocks SB0, SB1, SB2, and SB3 into the mixed super blocks, and then collect the four source blocks included in the four mixed super blocks and regroup them into the source super block according to the "specific condition."

Referring to FIGS. 1 and 5B, it may be seen that the controller 130 swaps the source block BLOCK<20>, included in the first mixed super block SB0, for the general block BLOCK<2100> included in the fourth mixed super block SB3. Accordingly, the first mixed super block SB0 may be in a state including only the four general blocks BLOCK<0, 10, 2100, 30>. Therefore, the controller 130 may categorize the first mixed super block SB0 as the general super block after swapping the source block BLOCK<20> for the general block BLOCK<2100>.

Similarly, it may be seen that the controller 130 swaps the source block BLOCK<31>, included in the second mixed super block SB1, for the general block BLOCK<33> included in the fourth mixed super block SB3. Accordingly, the second mixed super block SB1 may be in a state including only the four general blocks BLOCK<1, 11, 21, 33>. Therefore, the controller 130 may categorize the second mixed super block SB1 as the general super block after swapping the source block BLOCK<31> for the general block BLOCK<33>.

In addition, it may be seen that the controller 130 swaps the source block BLOCK<12>, included in the third mixed super block SB2, for the general block BLOCK<13> included in the fourth mixed super block SB3. Accordingly, the third mixed super block SB2 may be in a state including only the four general blocks BLOCK<2, 13, 22, 32>. Therefore, the controller 130 may categorize the third mixed super block SB2 as the general super block after swapping the source block BLOCK<12> for the general block BLOCK<13>.

Through the above-described operation of the controller 130, the fourth mixed super block SB3 may be in a state including only the four source blocks BLOCK<3, 12, 20, 31>. Therefore, after the swapping operation, the controller 130 may categorize the super block SB3 as the source super block.

After that, the controller 130 may perform a merge operation of moving valid data of the source super block SB3 to one or more general super blocks.

Figure 6A:
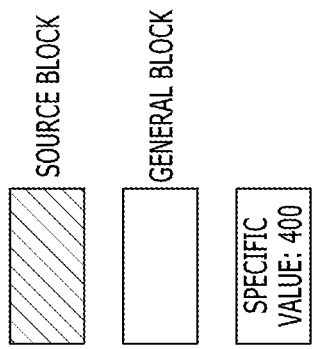
FIGS. 6A and 6B illustrate an operating method of a memory system in accordance with another embodiment.
Figure 6B:
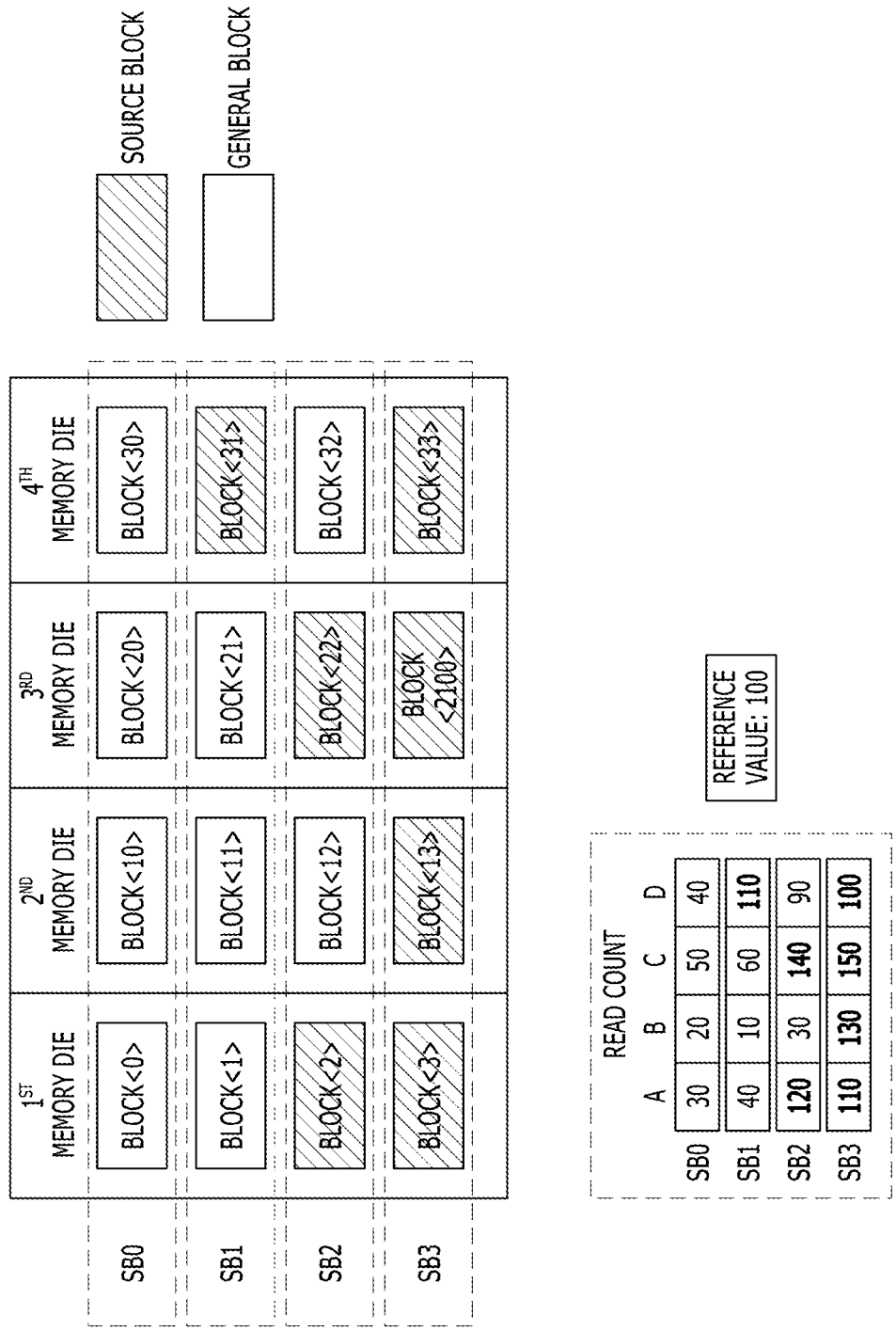

FIGS. 6A and 6B illustrate an operating method of a memory system according to another embodiment.

Referring to FIGS. 6A and 6B, a memory device includes a plurality of memory dies 150A, 150B, 150C, and 150D in the same manner as the memory device 150 described with reference to FIG. 1. However, although FIG. 1 illustrates that the four memory blocks are included in each of the memory dies 150A, 150B, 150C, and 150D, a larger number of memory blocks may be included in each of the memory dies 150A, 150B, 150C, and 150D in FIGS. 6A and 6B. In FIGS. 6A and 6B, it may be seen that one memory block is selected from each of a plurality of memory blocks BLOCK<0, 1, 2, 3, . . . >, BLOCK<10, 11, 12, 13, . . . >, BLOCK<20, 21, 22, 23, . . . >, and BLOCK<30, 31, 32, 33, . . . > included in the memory dies 150A, 150B, 150C, and 150D, respectively, and the selected memory blocks are grouped into a plurality of super blocks SB0, SB1, SB2, and SB3. In other words, it may be seen that four first memory blocks BLOCK<0, 10, 20, 30> included in the respective four memory dies 150A, 150B, 150C, and 150D are collected and grouped into a first super block SB0. It may be seen that four second memory blocks BLOCK<1, 11, 21, 31> included in the respective four memory dies 150A, 150B, 150C, and 150D are collected and grouped into a second super block SB1. It may be seen that four third memory blocks BLOCK<2, 12, 22, 32> included in the respective four memory dies 150A, 150B, 150C, and 150D are collected and grouped into a third super block SB2. It may be seen that three fourth memory blocks BLOCK<3, 13, 33> included in the respective first, second, and fourth memory dies 150A, 150B, and 150D and a $101^{st}$ memory block BLOCK<2100> included in the third memory die 150C are collected and grouped into a fourth superblock SB3.

Specifically, referring to FIGS. 1 and 6A, the controller 130 may check a plurality of sum values obtained by summing up read counts of the memory blocks BLOCK<0, 10, 20, 30>, BLOCK<1, 11, 21, 31>, BLOCK<2, 12, 22, 32>, and BLOCK<3, 13, 2100, 33> included in the super blocks SB0, SB1, SB2, and SB3, respectively, in units of super blocks.

For example, in FIG. 6A, it may be seen that the sum value obtained by summing up the read counts of the four memory blocks BLOCK<0, 10, 20, 30> included in the first super block SB0 is "410." It may be seen that the sum value obtained by summing up the read counts of the four memory blocks BLOCK<1, 11, 21, 31> included in the second super block SB1 is "390." It may be seen that the sum value obtained by summing up the read counts of the four memory blocks BLOCK<2, 12, 22, 32> included in the third super block SB2 is "220." It may be seen that the sum value obtained by summing up the read counts of the four memory blocks BLOCK<3, 13, 2100, 33> included in the fourth super block SB3 is "600."

The controller 130 may select a super block corresponding to a sum value equal to or greater than a specific value among the plurality of sum values corresponding to the super blocks SB0, SB1, SB2, and SB3, check types of memory blocks included in the selected super block, and then sort the selected super block. When the memory blocks included in the selected super block are all general blocks, the controller 130 may sort the selected super block into the general super block. When the memory blocks included in the selected super block are in a state where general blocks and source blocks are mixed, the controller 130 may sort the selected super block into the mixed super block. When the memory blocks included in the selected super block are all source blocks, the controller 130 may sort the selected super block into the source super block.

For example, in FIG. 6A, it is assumed that the sum value of the first super block SB0 is "410," the sum value of the second super block SB1 is "390," the sum value of the third super block SB2 is "220," the sum value of the fourth super block SB3 is "600," and the specific value is "400." It is also assumed that the memory blocks BLOCK<3, 2100, 31> included in the second and fourth super blocks SB1 and SB3 are source blocks.

Accordingly, the controller 130 may select the first super block SB0 and the fourth super block SB3 which each have sum values higher than the specific value of "400." Subsequently, the controller 130 may check types of the memory blocks BLOCK<0, 10, 20, 30> included in the selected first super block SB0. As a check result, it may be seen that the memory blocks BLOCK<0, 10, 20, 30> included in the first super block SB0 are all the general blocks. Accordingly, the controller 130 may sort the first super block SB0 into the general super block. Similarly, the controller 130 may check types of the memory blocks BLOCK<3, 13, 2100, 33> included in the selected fourth super block SB3. As a check result, it may be seen that the two memory blocks BLOCK<3, 2100> are the source blocks, and the two memory locks BLOCK<13, 33> are the general blocks, among the memory blocks BLOCK<3, 13, 2100, 33> included in the fourth super block SB3. In other words, the source blocks and the general blocks are mixed and included in the fourth super block SB3. Therefore, the controller 130 may sort the fourth super block SB3 into the mixed super block.

In the embodiment of FIG. 6A, since the controller 130 performs an operation of checking the plurality of sum values for the plurality of super blocks SB0, SB1, SB2, and SB3, selecting some super blocks having sum values higher than the specific value, and then checking types of the selected super blocks again, that is, checking whether to continue to sort the selected super blocks into the general super blocks or whether to sort the selected super blocks into the mixed or source super blocks, the controller 130 may check the types of the super blocks relatively rapidly even when there are a large number of super blocks. On the other hand, since the types of only the selected super blocks are checked, the accuracy of the operation of checking the types of the super blocks SB0, SB1, SB2, and SB3 may be reduced. For example, in FIG. 6A, since the second super block SB1 includes the source block BLOCK<31> and the three general blocks BLOCK<1, 11, 21>, the second super block SB1 has to be sorted into the mixed super block. However, since the second super block SB1 has the sum value of "390" smaller than the specific value, the second super block SB1 is not selected and thus the controller 130 may not perform the operation of checking the type of the second super block SB1. To overcome such a drawback, a method described below with reference to FIG. 6B may be used.

Referring to FIGS. 1 and 6B, the controller 130 may check read counts of the memory blocks BLOCK<0, 10, 20, 30>, BLOCK<1, 11, 21, 31>, BLOCK<2, 12, 22, 32>, and BLOCK<3, 13, 2100, 33> included in the super blocks SB0, SB1, SB2, and SB3, respectively, and sort the memory blocks into source blocks and general blocks according to the checked read counts.

For example, in FIG. 6B, it may be seen that the read counts of the four memory blocks BLOCK<0, 10, 20, 30> included in the first super block SB0 are 30, 20, 50, and 40, respectively. Since a reference value is "100," the controller 130 may sort all the four memory blocks BLOCK<0, 10, 20, 30>, included in the first super block SB0, into the general blocks.

It may be seen that the read counts of the four memory blocks BLOCK<1, 11, 21, 31> included in the second super block SB1 are 40, 10, 60, and 110, respectively. Since the reference value is "100," the controller 130 may sort the three memory blocks BLOCK<1, 11, 21> into the general blocks and the one memory block BLOCK<31> into the source block, among the four memory blocks BLOCK<1, 11, 21, 31> included in the second super block SB1.

It may be seen that the read counts of the four memory blocks BLOCK<2, 12, 22, 32> included in the third super block SB2 are 120, 30, 140, and 90, respectively. Since the reference value is "100," the controller 130 may sort the two memory blocks BLOCK<2, 22> into the source blocks and the two memory blocks BLOCK<12, 32> into the general blocks, among the four memory blocks BLOCK<2, 12, 22, 32> included in the third super block SB2.

It may be seen that the read counts of the four memory blocks BLOCK<3, 13, 2100, 33> included in the fourth super block SB3 are 110, 130, 150, and 100, respectively. Since the reference value is "100," the controller 130 may sort all the four memory blocks BLOCK<3, 13, 2100, 33>, included in the fourth super block SB3, into the source blocks.

The controller 130 may sort the memory blocks BLOCK<0, 10, 20, 30>, BLOCK<1, 11, 21, 31>, BLOCK<2, 12, 22, 32>, and BLOCK<3, 13, 2100, 33>, included in the super blocks SB0, SB1, SB2, and SB3, respectively, into the source blocks and the general blocks, and then determine types of the super blocks SB0, SB1, SB2, and SB3 according to the sorting result. In other words, the controller 130 may continue to sort the super block including only the general blocks, among the super blocks SB0, SB1, SB2, and SB3, into the general super block. In addition, the controller 130 may sort the super block including both of the general block and the source block, among the super blocks SB0, SB1, SB2, and SB3, into the mixed super block. Further, the controller 130 may sort the super block including only the source blocks, among the super blocks SB0, SB1, SB2, and SB3, into the source super block.

For example, in FIG. 6B, since all the four memory blocks BLOCK<0, 10, 20, 30> included in the first super block SB0 are the general blocks, the controller 130 may continue to sort the first super block SB0 into the general super block. Since the three memory blocks BLOCK<1, 11, 21> are the general blocks and the one memory block BLOCK<31> is the source block, among the four memory blocks BLOCK<1, 11, 21, 31> included in the second super block SB1, the controller 130 may sort the second super block SB1 into the mixed super block. Since the two memory blocks BLOCK<2, 22> are the source blocks and the two memory blocks BLOCK<12, 32> are the general blocks, among the four memory blocks BLOCK<2, 12, 22, 32> included in the third super block SB2, the controller 130 may sort the third super block SB2 into the mixed super block. Since all the four memory blocks BLOCK<3, 13, 2100, 33> included in the fourth super block SB3 are the source blocks, the controller 130 may sort the fourth super block SB3 into the source super block.

Figure 7A:
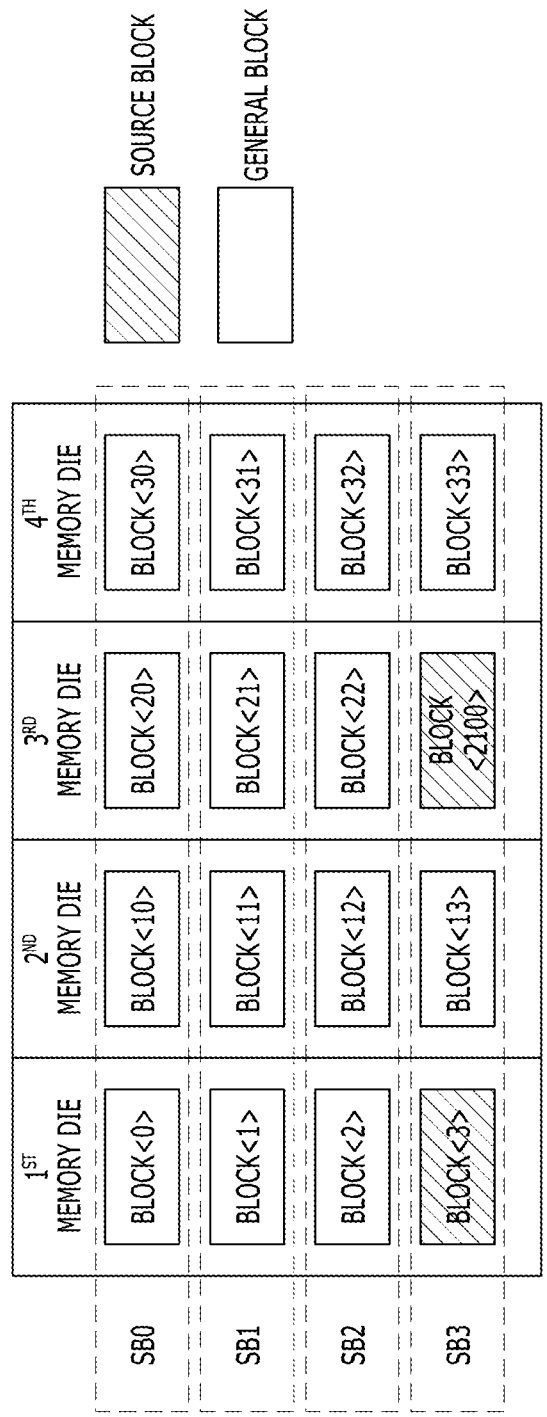
FIGS. 7A and 7B illustrate an operating method of a memory system in accordance with still another embodiment.
Figure 7B:
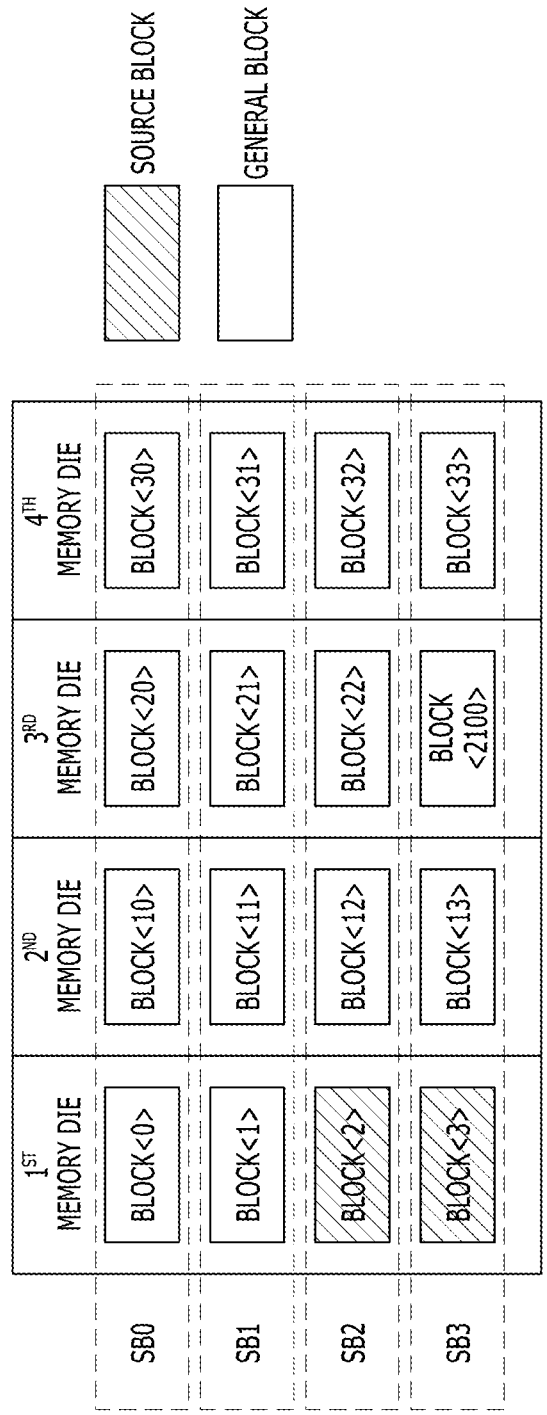

FIGS. 7A and 7B illustrate an operating method of a memory system according to still another embodiment.

Referring to FIGS. 7A and 7B, a memory device includes a plurality of memory dies 150A, 150B, 150C, and 150D in the same manner as the memory device 150 described with reference to FIG. 1. However, although FIG. 1 illustrates that the four memory blocks are included in each of the memory dies 150A, 150B, 150C, and 150D, a larger number of memory blocks may be included in each of the memory dies 150A, 150B, 150C, and 150D in FIGS. 7A and 7B. In FIGS. 7A and 7B, it may be seen that one memory block is selected from each of a plurality of memory blocks BLOCK<0, 1, 2, 3, . . . >, BLOCK<10, 11, 12, 13, . . . >, BLOCK<20, 21, 22, 23, . . . >, and BLOCK<30, 31, 32, 33, . . . > included in the memory dies 150A, 150B, 150C, and 150D, respectively, and the selected memory blocks are grouped into a plurality of super blocks SB0, SB1, SB2, and SB3. In other words, it may be seen that four first memory blocks BLOCK<0, 10, 20, 30> included in the respective four memory dies 150A, 150B, 150C, and 150D are collected and grouped into a first super block SB0. It may be seen that four second memory blocks BLOCK<1, 11, 21, 31> included in the respective four memory dies 150A, 150B, 150C, and 150D are collected and grouped into a second super block SB1. It may be seen that four third memory blocks BLOCK<2, 12, 22, 32> included in the respective four memory dies 150A, 150B, 150C, and 150D are collected and grouped into a third super block SB2. It may be seen that three fourth memory blocks BLOCK<3, 13, 33> included in the respective first, second, and fourth memory dies 150A, 150B, and 150D and a $101^{st}$ memory block BLOCK<2100> included in the third memory die 150C are collected and grouped into a fourth superblock SB3.

In FIG. 7A, it is assumed that that the memory blocks BLOCK<3, 2100> in the fourth super block SB3 are source blocks, and the other memory blocks in the first to fourth super blocks SB0 to SB3 are general blocks.

Specifically, referring to FIGS. 1 and 7A, it may be seen that the first super block SB0, the second super block SB1, and the third super block SB2 among the plurality of super blocks SB0, SB1, SB2, and SB3 include only general blocks. Accordingly, the controller 130 may maintain types of the first super block SB0, the second super block SB1, and the third super block SB2 as the general super blocks. On the other hand, it may be seen that the fourth super block SB3 includes two general blocks BLOCK<13, 33> and two source blocks BLOCK<3, 2100>. Accordingly, the controller 130 may sort the fourth super block SB3 into the mixed super block. In other words, it may be seen that the number of super blocks, which can be sorted into the mixed super block, among the plurality of super blocks SB0, SB1, SB2, and SB3, is 1.

As such, when a state where only one super block can be sorted into the mixed super block, among the plurality of super blocks SB0, SB1, SB2, and SB3, is maintained for a "predetermined time" or more, the controller 130 may perform a merge operation on the only one mixed super block. That is, the controller 130 may move valid data included in the only one mixed super block, e.g., the fourth super block SB3 in FIG. 7A, to one or more general super blocks.

The reason why the operation illustrated in FIG. 7A is required is that, even though an operation of collecting and regrouping source blocks, which are included in two or more mixed super blocks, into the source super blocks is repeatedly performed, one or more mixed super blocks may be left without being regrouped into the source super blocks. For example, as illustrated in FIG. 7A, when the number of source blocks is 2 (BLOCK<3, 2100>) among the plurality of memory blocks BLOCK<0, 1, 2, 3, . . . >, BLOCK<10, 11, 12, 13, . . . >, BLOCK<20, 21, 22, 23, . . . >, and BLOCK<30, 31, 32, 33, . . . > included in the memory device 150, and the two source blocks BLOCK<3, 2100> are included in one mixed super block SB3, the source blocks BLOCK<3, 2100> may not be regrouped into the source super block. Therefore, the controller 130 may perform the merge operation on the mixed super block SB3 when the state illustrated in FIG. 7A is maintained for the "predetermined time" or more.

The "predetermined time" may be an absolutely defined time or a time taken for a specific operation to be repeated a specific number of times in the memory device 150. For example, the "predetermined time" may be a time taken for a read operation to be repeated 100 times in the memory device 150.

The "predetermined time" may be set in various ways by a system designer, depending on types or used methods of the plurality of memory blocks BLOCK<0, 1, 2, 3, . . . >, BLOCK<10, 11, 12, 13, . . . >, BLOCK <20, 21, 22, 23, . . . >, and BLOCK<30, 31, 32, 33, . . . > included in the memory device 150, for example, depending on whether the memory blocks are SLC blocks or MLC blocks.

Referring to FIGS. 1 and 7B, it may be seen that the first super block SB0 and the second super block SB1 among the plurality of super blocks SB0, SB1, SB2, and SB3 include only general blocks. Accordingly, the controller 130 may maintain types of the first super block SB0 and the second super block SB1 as the general super blocks. On the other hand, it may be seen that the third super block SB2 includes one source block BLOCK<2> and three general blocks BLOCK<12, 22, 32>. Also, it may be seen that the fourth super block SB3 includes one source block BLOCK<3> and three general blocks BLOCK<13, 2100, 33>. Accordingly, the controller 130 may sort the third super block SB2 and the fourth super block SB3 into the mixed super blocks. In other words, it may be seen that the number of super blocks which can be sorted into the mixed super blocks, among the plurality of super blocks SB0, SB1, SB2, and SB3, is 2.

As such, even though the two mixed super blocks SB2 and SB3 are present, an operation of sorting and regrouping the source blocks included in the two mixed super blocks SB2 and SB3 may not be performed. The reason is that the one source block BLOCK<2> in the third super block SB2 and the one source block BLOCK<3> in the fourth super block SB3 do not satisfy the "specific condition." In other words, since the interleaving operation cannot be performed between the one source block BLOCK<2> in the third super block SB2 and the one source block BLOCK<3> in the fourth super block SB3, which are included in the first memory die 150A, the memory blocks BLOCK<2, 3> may not be grouped into the source super block. Accordingly, the third super block SB2 and the fourth super block SB3 may be maintained as the mixed super blocks.

When the mixed super block is not regrouped into the source super block but maintained as the mixed super block for the "predetermined time," the controller 130 may perform the merge operation on the mixed super block. In other words, the controller 130 may move valid data included in the mixed super block to one or more general super blocks when the mixed super block is maintained as the mixed super block for the "predetermined time" without being regrouped.

The effects of the memory system according to the embodiments of the present disclosure are described as follows.

In a case where memory blocks on which read requests are concentrated are distributed in two or more super blocks when a plurality of memory blocks are operated by being grouped into a plurality of super blocks according to a specific condition, the memory system according to the embodiments of the present disclosure sorts only the memory blocks, on which the read requests are concentrated, from the plurality of super blocks, regroups the memory blocks into one or more super blocks, and then performs a merge operation on only the one or more super blocks, thereby greatly reducing the number of merge operations performed in units of super blocks.

While the present disclosure has been described with respect to specific embodiments, it will be apparent to those skilled in the art that various changes and modifications may be made without departing from the spirit and scope of the invention as defined in the following claims.

What is claimed is:

1. A memory system, comprising:
   a nonvolatile memory device including a plurality of memory blocks; and
   a controller suitable for grouping the plurality of memory blocks into a plurality of super blocks according to a specific condition, each of the plurality of super blocks including two or more memory blocks, sorting a mixed super block among the plurality of super blocks, the mixed super block including a source block and a general block, the source block being a memory block that has a read count equal to or greater than a reference value, the general block being a memory block that has a read count smaller than the reference value, collecting and regrouping two or more source blocks, included in two or more mixed super blocks, into one or more source super blocks according to the specific condition, and moving valid data of the one or more source super blocks to one or more general super blocks each of which includes general blocks only.

2. The memory system of claim 1, wherein the controller collects and regroups two or more general blocks included in the two or more mixed super blocks into one or more general super blocks according to the specific condition.

3. The memory system of claim 1, wherein the controller checks a plurality of sum values each of which is obtained by summing up read counts of the memory blocks included in each of the plurality of super blocks, selects a super block corresponding to a sum value equal to or greater than a specific value among the plurality of super blocks, and sorts the selected super block into the mixed super block or the one or more source super blocks according to types of the memory blocks included in the selected super block.

4. The memory system of claim 3, wherein the controller sorts the selected super block into the one or more source super blocks when only the source block is included in the selected super block, and sorts the selected super block into the mixed super block when the source block and the general block are included in the selected super block.

5. The memory system of claim 1, wherein the controller checks each of the memory blocks according to a read count, and sorts the mixed super block among the plurality of super blocks according to a check result.

6. The memory system of claim 5, wherein the controller sorts a super block including only source blocks, among the plurality of super blocks, into the one or more source super blocks according to the check result, and sorts a super block in which the source block and the general block are mixed, among the plurality of super blocks, into the mixed super block according to the check result.

7. The memory system of claim 1, wherein, when it is checked that only one mixed super block is present in the nonvolatile memory device for a predetermined time, the controller moves valid data of the one mixed super block to one or more general super blocks.

8. The memory system of claim 1, wherein, when the two or more source blocks included in the two or more mixed super blocks are collected for a predetermined time but do not satisfy the specific condition, the controller moves valid data stored in each of the two or more mixed super blocks to one or more general super blocks.

9. The memory system of claim 1, wherein the controller is connected to the nonvolatile memory device through a plurality of data paths, and the specific condition includes whether two or more memory blocks in the nonvolatile memory device are capable of inputting and outputting data in an interleaving manner through the plurality of data paths.

10. A method of operating a memory system that includes a nonvolatile memory device including a plurality of memory blocks, the method comprising:
    grouping the plurality of memory blocks into a plurality of super blocks according to a specific condition, each of the plurality of super blocks including two or more memory blocks;
    sorting a mixed super block among the plurality of super blocks, the mixed super block including a source block and a general block, the source block being a memory block that has a read count equal to or greater than a reference value, the general block being a memory block that has a read count smaller than the reference value;
    collecting and regrouping two or more source blocks, included in two or more mixed super blocks, into one or more source super blocks according to the specific condition; and
    moving valid data of the one or more source super blocks to one or more general super blocks each of which includes general blocks only.

11. The method of claim 10, further comprising collecting and regrouping two or more general blocks, included in the two or more mixed super blocks, into one or more general super blocks according to the specific condition.

12. The method of claim 10, wherein sorting the mixed super block comprises:
    checking a plurality of sum values each of which is obtained by summing up read counts of the memory blocks included in each of the plurality of super blocks;
    selecting a super block corresponding to a sum value equal to or greater than a specific value among the plurality of super blocks; and
    sorting the selected super block into the mixed super block or the one or more source super blocks according to types of the memory blocks included in the selected super block.

13. The method of claim 12, wherein sorting the selected super block comprises:
    sorting the selected super block into the one or more source super blocks when only the source block is included in the selected super block; and
    sorting the selected super block into the mixed super block when the source block and the general block are included in the selected super block.

14. The method of claim 10, wherein sorting the mixed super block comprises:
    checking each of the memory blocks according to a read count; and sorting the mixed super block among the plurality of super blocks according to a checking result.

15. The method of claim 14, wherein sorting the mixed super block comprises:
sorting a super block including only the source block, among the plurality of super blocks, into the one or more source super blocks according to the checking result; and
sorting a super block in which the source block and the general block are mixed, among the plurality of super blocks, into the mixed super block according to the checking result.

16. The method of claim 10, further comprising, when it is checked that only one mixed super block is present in the nonvolatile memory device for a predetermined time without being regrouped into the one or more source super blocks, moving valid data of the one mixed super block to one or more general super blocks.

17. The method of claim 10, further comprising, when the two or more source blocks included in the two or more mixed super blocks are collected for a predetermined time but do not satisfy the specific condition, moving valid data stored in each of the two or more mixed super blocks to one or more general super blocks.

18. The method of claim 10, wherein a plurality of data paths are connected to the nonvolatile memory device, and the specific condition includes whether two or more memory blocks in the nonvolatile memory device are capable of inputting and outputting data in an interleaving manner through the plurality of data paths.

* * * * *